US007379047B2

(12) United States Patent
Drucker et al.

(10) Patent No.: US 7,379,047 B2
(45) Date of Patent: May 27, 2008

(54) USING A PHYSICAL OBJECT TO CONTROL AN ATTRIBUTE OF AN INTERACTIVE DISPLAY APPLICATION

(75) Inventors: Steven M. Drucker, Bellevue, WA (US); Curtis Wong, Bellevue, WA (US); Asta Roseway, Redmond, WA (US); Joel Dehlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 718 days.

(21) Appl. No.: 10/883,253

(22) Filed: Jun. 30, 2004

(65) Prior Publication Data

US 2006/0001645 A1 Jan. 5, 2006

(51) Int. Cl.
*G09G 5/08* (2006.01)
(52) U.S. Cl. .................. 345/156; 345/163; 345/175
(58) Field of Classification Search ........... 345/156, 345/163, 175
See application file for complete search history.

(56) References Cited

U.S. PATENT DOCUMENTS

| 4,992,650 A | | 2/1991 | Somerville ................ 235/462 |
| 5,729,704 A | * | 3/1998 | Stone et al. ............... 715/804 |
| 5,732,227 A | * | 3/1998 | Kuzunuki et al. ......... 715/775 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.
"Bar Code 1, 2-Dimensional Bar Code Page." Available http://www.adams1.com/pub/russadam/stack.html. Printed Jan. 20, 2004. 14pp.
Ambiente article. "InteracTable®." Dated Jul. 7, 2000. Available http://www.darmstadt.gmd.de/ambiente/activities/interactable.html. Printed Nov. 21, 2003. 3pp.
Bier, Stone, Pier, Buston, and DeRose. "Toolglass and Magic Lenses: The See-Through Interface." *Proceedings of Siggraph '93* (Anaheim, August). *Computer Graphics Annual Conference Series*, ACM, 1993, pp. 73-80. 8pp.
Blickenstorfer, Conrad H. "First Look: Acer TravelMate TM100 with Windows XP Tablet PC Edition." Pen Computing Magazine. Jul. 2002. pp. 44-47.

(Continued)

*Primary Examiner*—Richard Hjerpe
*Assistant Examiner*—Leonid Shapiro
(74) *Attorney, Agent, or Firm*—Workman Nydegger

(57) ABSTRACT

An input to a computer system is made by manipulating a physical object disposed adjacent to an interactive display surface. An application having at least one changeable attribute is executed on the computer system. When the physical object is disposed adjacent to the interactive display surface, it is identified and its location is determined based upon a shape, a size, an infrared reflectance, or some other optical quality. The initial location and orientation of the physical object on the interactive display surface relative to the interactive display surface is identified. The attribute of the application is correlated with the physical object and is changed in response to movement of the physical object. The physical object can thus be used, for example, to select menu options and parameters within the application being executed.

55 Claims, 14 Drawing Sheets

OTHER PUBLICATIONS

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Stamer, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." 5th *International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer. Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5 pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalaváari. "Using Transparent Props for Interaction With The Virtual Table." Presented at *1999 ACM Symposium on Interactive 3D Graphics (I3DG '99)*. Apr. 26-28, 1999, Atlanta, GA. 7 pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar. + Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *Chi 2004*, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Stamer, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geiβler, Holmer, Konomi, Müller-Tomfelde, Reischl, Rexrogh, Seitz, and Steinmetz. "i-LAND: An interactive Landscape for Creativity and Innovation." *Proceeding of the ACM Conference on Human Factors in Computing Systems (CHI'99)*, Pittsburgh, Pennsylvania, May 15-20, 1999. ACM Press, New York. pp. 120-127.

Symanzik Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metadesk: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. Interact 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8 pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3 pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

* cited by examiner

USING A PHYSICAL OBJECT TO CONTROL AN ATTRIBUTE OF AN INTERACTIVE DISPLAY APPLICATION

FIELD OF THE INVENTION

The present invention generally pertains to a computing system having an interactive display surface operable to recognize objects in proximity to the interactive display surface, and, more specifically, to exploit the recognition capability of the interactive display surface to control applications executable on the computing system.

BACKGROUND OF THE INVENTION

It is well understood that the proliferation of personal computers has revolutionized the very nature of computing. The personal computer brought computers out of climate controlled data centers of large corporations and into small businesses and homes. Well before the Internet became widely available, people began using computers on a daily basis for activities ranging from accounting and tracking personal finances, to word processing, to games.

In hindsight, part of what is remarkable about the personal computer revolution is that the early personal computers were not very user friendly. The human-machine interface on early machines typically consisted of a monochromatic display for presenting information to the user and a keyboard for entering data and giving commands to the computer. While personal computers were powerful tools, using keyboards to get the computers to perform desired tasks was not always straightforward, and certainly not always easy.

To initiate commands on earlier personal computers, users typically had to remember obscure keystroke combinations or, type commands and file names. For example, merely to retrieve a document or other object, a user had to remember the specific function key or other key string that should be pressed to initiate a retrieval command. With the command entered, the user either had to remember and key in the name of the data file desired, or, possibly review a listing of the names of documents available on a storage device until the desired data file was found. Even so, prior to the proliferation of graphical user interface operating systems, file names typically were limited to eight characters. Thus, merely trying to identify the desired file was not a simple matter.

Once a file was retrieved, the user was able to make changes to the file, but once again, the user typically had to remember the appropriate function keys or other keystrings required to initiate particular commands. Because of the numerous permutations and combinations of the SHIFT, ALT, CTRL, and function keys that might have to be used to enter commands in revising a document, users commonly relied upon keyboard overlay templates that literally listed all the available commands associated with each key or keystroke combination. Saving the revised document also required similar, non-user friendly processes.

Fortunately, the development of graphical user interfaces, such as provided by Microsoft Corporation's WINDOWS™ operating system, began a transformation of human-machine interaction. Improving processor and memory price-performance supported user environments where users were able to engage the computer with an intuitive pointing device such as a mouse, to point and click to select desired functions. The personal computer revolution took a dramatic step forward due to the power of such user-friendly interfaces.

In seeking to further improve the human-machine interface, ever-increasing hardware capabilities have made possible voice and speech recognition systems that avoid the need to enter text on a keyboard. Personal digital assistants and tablet PCs can now recognize human handwriting. Such hardware can thus provide a more efficient and satisfying experience for users who prefer not to type on a keyboard or are less proficient in doing so.

As computers become more ubiquitous throughout our environment, the desire to make computers and their interfaces even more user friendly continues to promote development in this area. For example, the MIT Media Lab, as reported by Brygg Ullmer and Hiroshi Ishii in "The metaDESK: Models and Prototypes for Tangible User Interfaces," *Proceedings of UIST* 10/1997:14-17," has developed another form of "keyboardless" human-machine interface. The metaDESK includes a generally planar graphical surface that not only displays computing system text and graphic output, but also receives user input by responding to an object placed against the graphical surface. The combined object responsive and display capability of the graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of an object placed on the graphical surface.

Others have been developing similar keyboardless interfaces. For example, papers published by Jun Rekimoto of the Sony Computer Science Laboratory, Inc., and associates describe a "HoloWall" and a "HoloTable" that display images on a surface and use IR light to detect objects positioned adjacent to the surface.

By detecting a specially formed object or IR-reflected light from an object disposed on a graphical display surface, the metaDESK can respond to the contemporaneous placement and movement of the object on the display surface to carryout a predefined function, such as displaying and moving a map of the MIT campus. Ultimately, however, it would be desirable to expand upon this functionality, to enable a user to interact with a display surface with additional or other objects that make the use of a personal computer even more convenient. It would therefore clearly be desirable to enable ordinary objects to interact with a computing system. It would further be desirable to provide an even more intuitive, user-friendly method to engage a computing system via an interactive display surface using ordinary objects to control an application that is being executed.

SUMMARY OF THE INVENTION

One of the advantages of the present invention is that it provides a convenient and intuitive way to control at least one attribute of a computer application executing on a computer system having an interactive display surface. An ordinary physical object may be placed on the interactive display surface. The associated computer system detects a position, shape, or other characteristic of the physical object and associates that characteristic with an attribute of the computer application. Manipulation of the physical object changes the characteristic perceived by the interactive display surface. Responding to the change in the characteristic, the computer system changes the attribute of the application program. Thus, a user can adjust the execution of the application program by placing an ordinary physical object on the interactive display surface and then manipulating the object.

One aspect of the present invention is thus directed to a method for making an input to a computer system by manipulating a physical object disposed adjacent to an interactive display surface. An application having at least one changeable attribute is executed on the computer system. When the physical object is disposed adjacent to the interactive display surface, a characteristic of the physical object, including at least one of a shape, a size, a reflectance, a location on the interactive display surface, and an initial orientation relative to the interactive display surface, is identified. The attribute of the application is correlated with the characteristic of the physical object. The attribute is changed in response to changes of the characteristic caused by movement of the physical object.

In accordance with one embodiment of the present invention, the characteristic may be determined by transmitting IR light through the interactive display surface toward a face of the interactive display surface adjacent to which the physical object is disposed and sensing IR light reflected from the physical object back through the interactive display surface. The outermost points of a face of the physical object are recognized as outermost adjoining points of a plurality of points having the same degree of reflectance of the IR light reflected back through the interactive display surface and exceeding a predetermined threshold reflectance. The threshold reflectance is set so as to disregard ambient IR light reflectance of the interactive display surface and IR light reflectance of objects outside a range of interest.

The characteristic of the physical object is preferably determined by identifying an ellipse representative of the characteristic of the physical object. The representative ellipse may be derived as having an equivalent statistical center and spatial moments of points defining the characteristic. Alternatively, the ellipse may be derived as having dimensions large enough to encompass all outermost points of the points defining the characteristic. The points defining the characteristic of the physical object include adjoining points of a plurality of points having a same degree of reflectance of the IR light, which is reflected back through the interactive display surface. The outermost points include points not having adjoining points in at least one considered direction.

Also, the characteristic can include at least one of the orientation of the object and the position of the physical object, so that either rotating or translating the physical object changes the attribute. The attribute is correlated with the characteristic of the physical object by associating the attribute with a region of the interactive display surface and detecting when the physical object is disposed adjacent to the region of the interactive display surface corresponding with the attribute.

In this method, a value of the attribute is correlated with the orientation of the physical object. A change in a location of the physical object on the interactive display surface is detected, and a scaling factor is adjusted based on the change in the location of the physical object. The scaling factor is applied to changes in the attribute associated with rotation of the physical object.

In one embodiment, a plurality of indicators representing a plurality of changeable program attributes are preferably displayed on the interactive display surface. A user is enabled to select a desired attribute from among the plurality of changeable program attributes by rotating the physical object or translating the physical object toward a desired indicator representing the desired attribute. In addition, a plurality of secondary indicators representing a plurality of secondary changeable program attributes associated with the desired indicator may be displayed. A user is then enabled to select a desired secondary attribute among the plurality of secondary changeable program attributes by either rotating the physical object or translating the physical object toward a desired secondary indicator. Selection of the desired attribute is detected, and the user is enabled to change a value of the changeable program attribute by either rotating the physical object or translating the physical object.

Further in accordance with the present invention, a plurality of data elements are associated with the physical object. The data elements are depicted by representations displayed on the interactive display surface adjacent a position of the physical object. These representations are then revolved or translated to correspond with movements of the physical object.

In accordance with still further features of the present invention, an audio signal can be generated when the physical object is disposed adjacent to the interactive display surface, the audio signal being associated with the shape of the physical object. The audio signal is generated from a predetermined list of audio signals, each audio signal in the list being associated with a different shape. Also, the audio signal generated can be varied according to the position on the interactive display surface where the physical object is disposed. The interactive display surface may be partitioned into a plurality of regions, with each of the regions being associated with a different category of audio signals associated with anticipated shapes. A property of the audio signal is generated upon detecting rotation or translation of the physical object. Properties of the audio signal can be changed in response to rotation or translation of the physical object include pitch, tempo, sustain, and harmonic property.

Also in accordance with another aspect of the present invention, a memory medium is provided on which are stored machine instructions for carrying out the steps of responding to a characteristic of the physical object, correlating an attribute of an application program with the characteristic of the physical object, and changing the attribute in response to changes of the characteristic, generally as described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 8A:
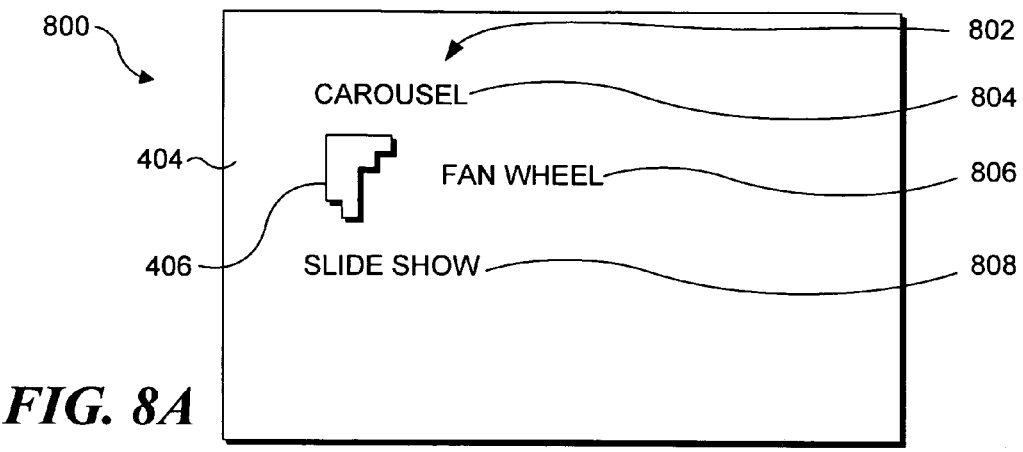
Figure 8B:
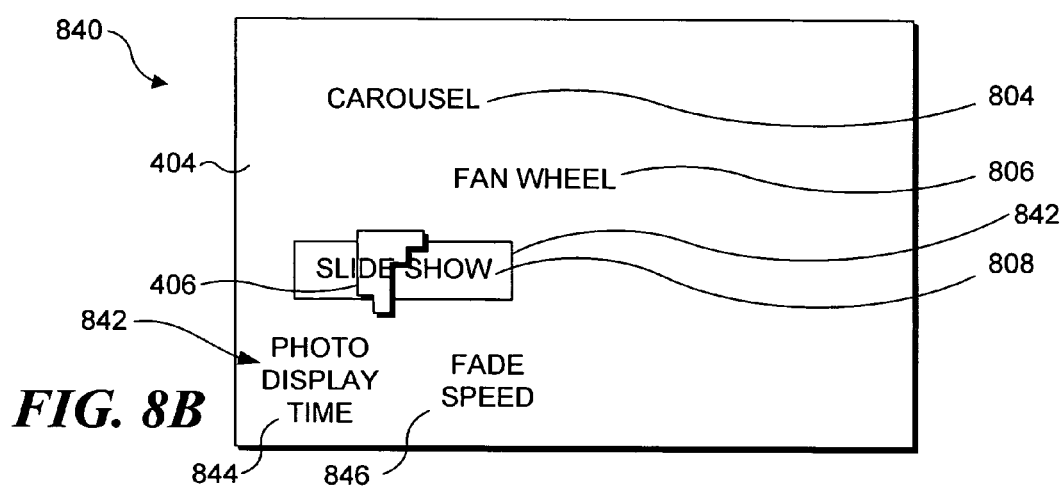
Figure 8C:
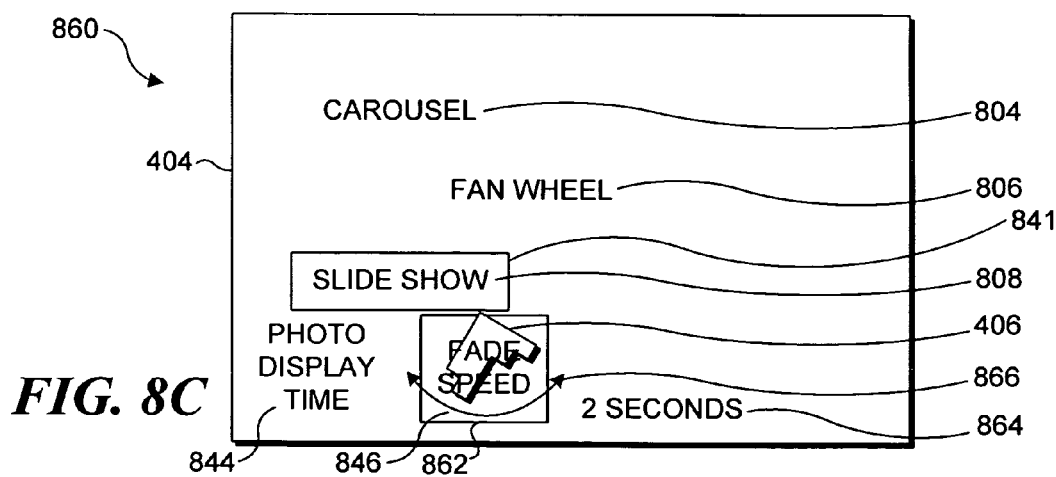
Figure 9A:
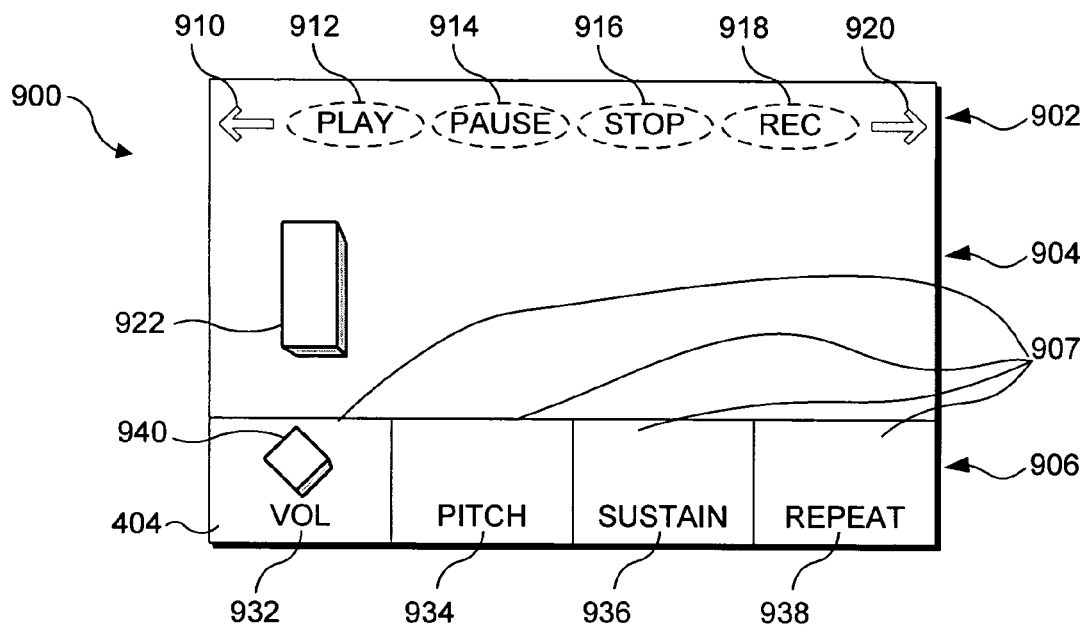
Figure 9B:
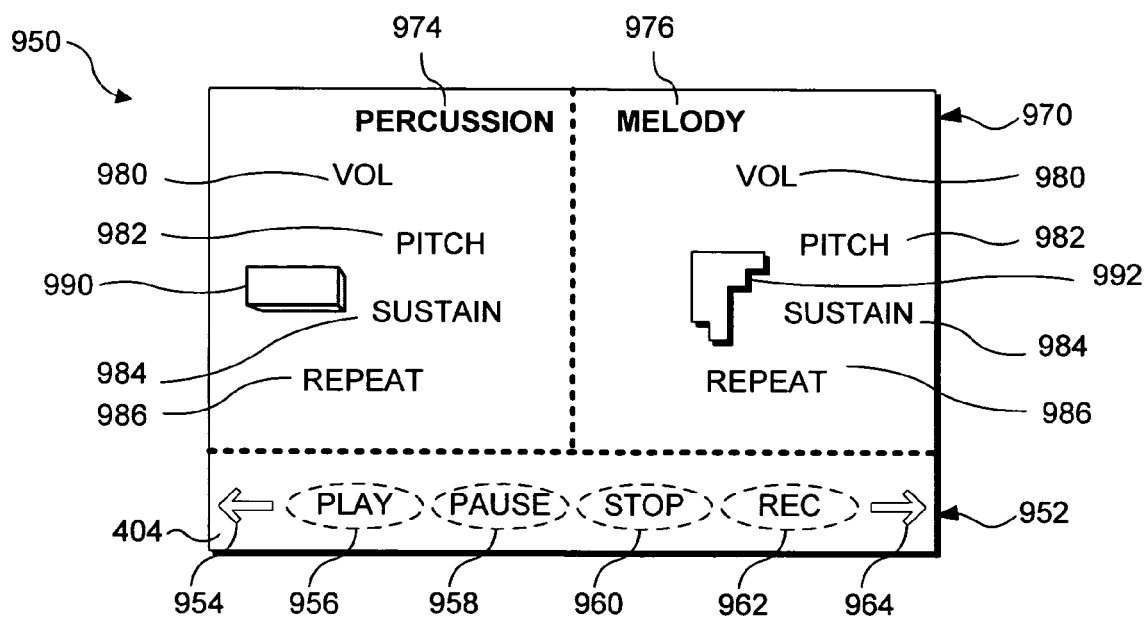
Figure 10:
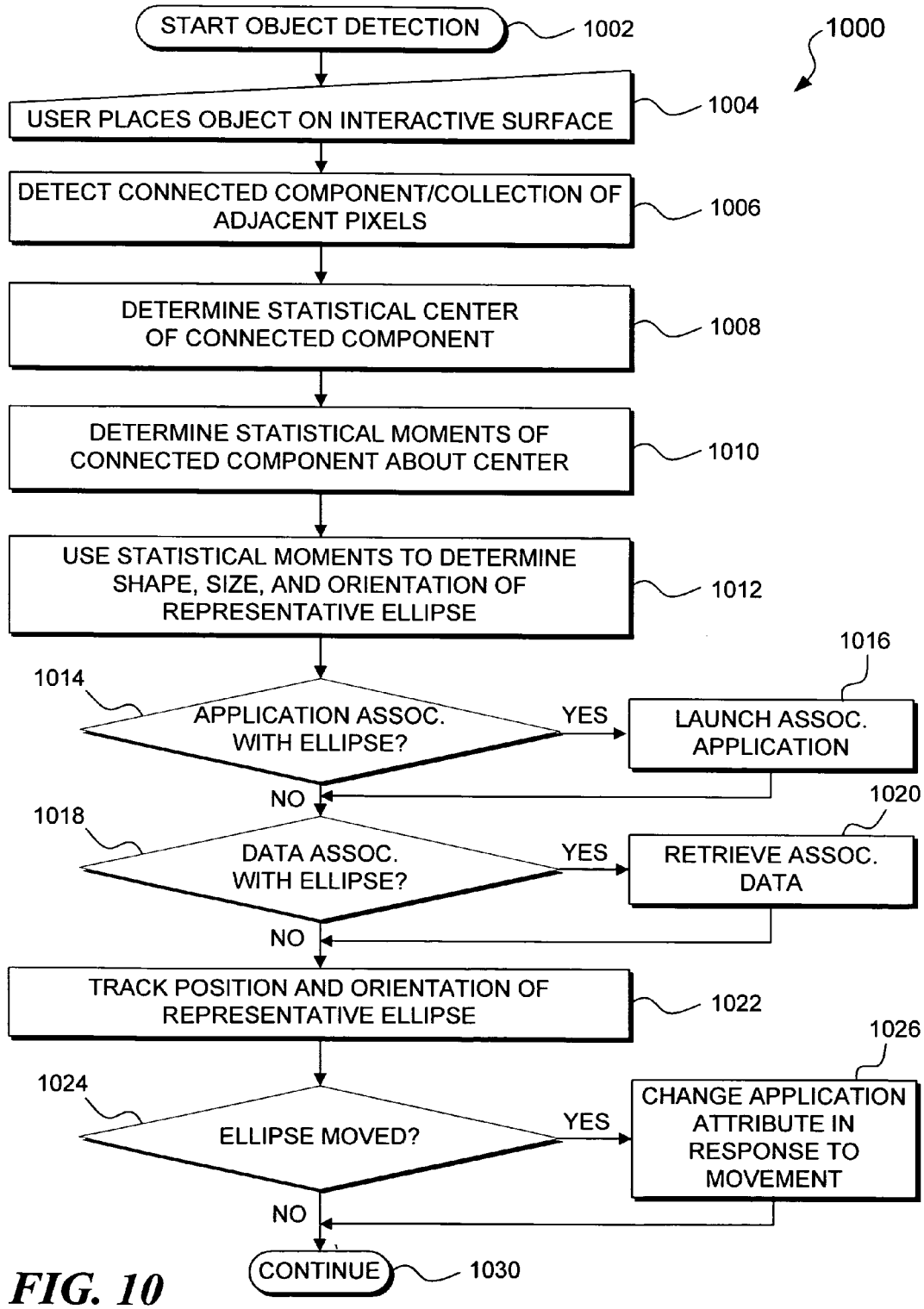
Figure 11:
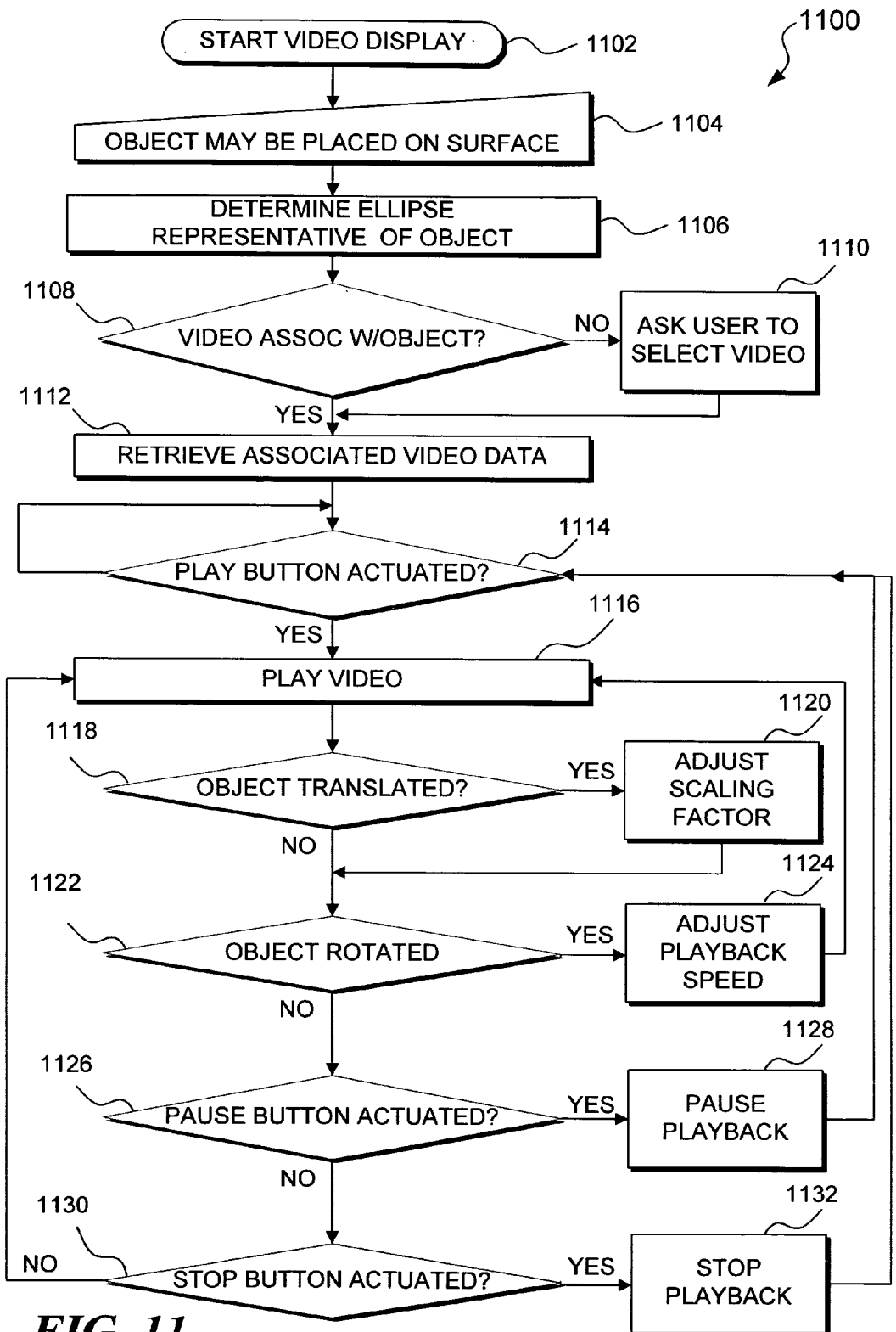
Figure 12:
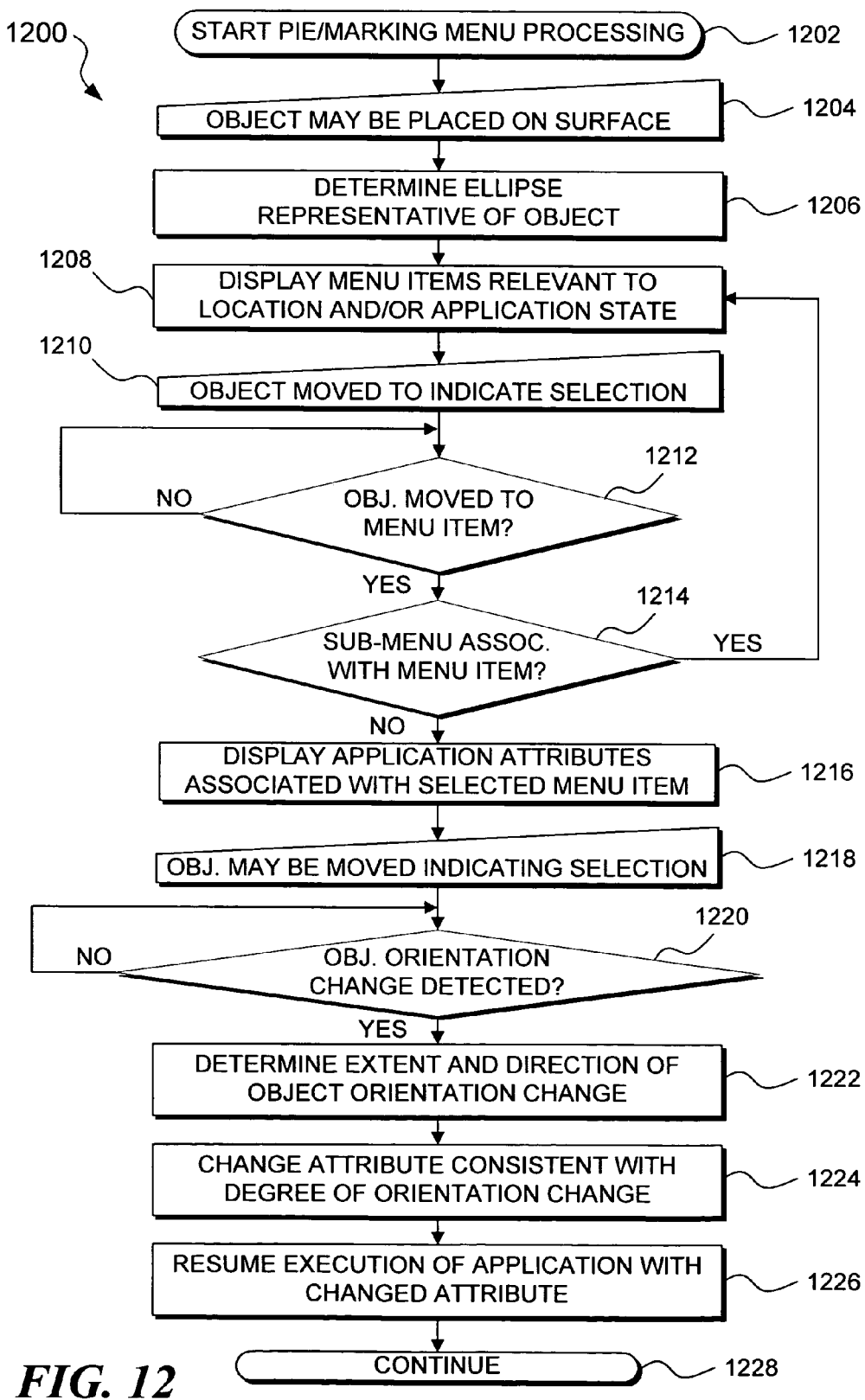
Figure 13:
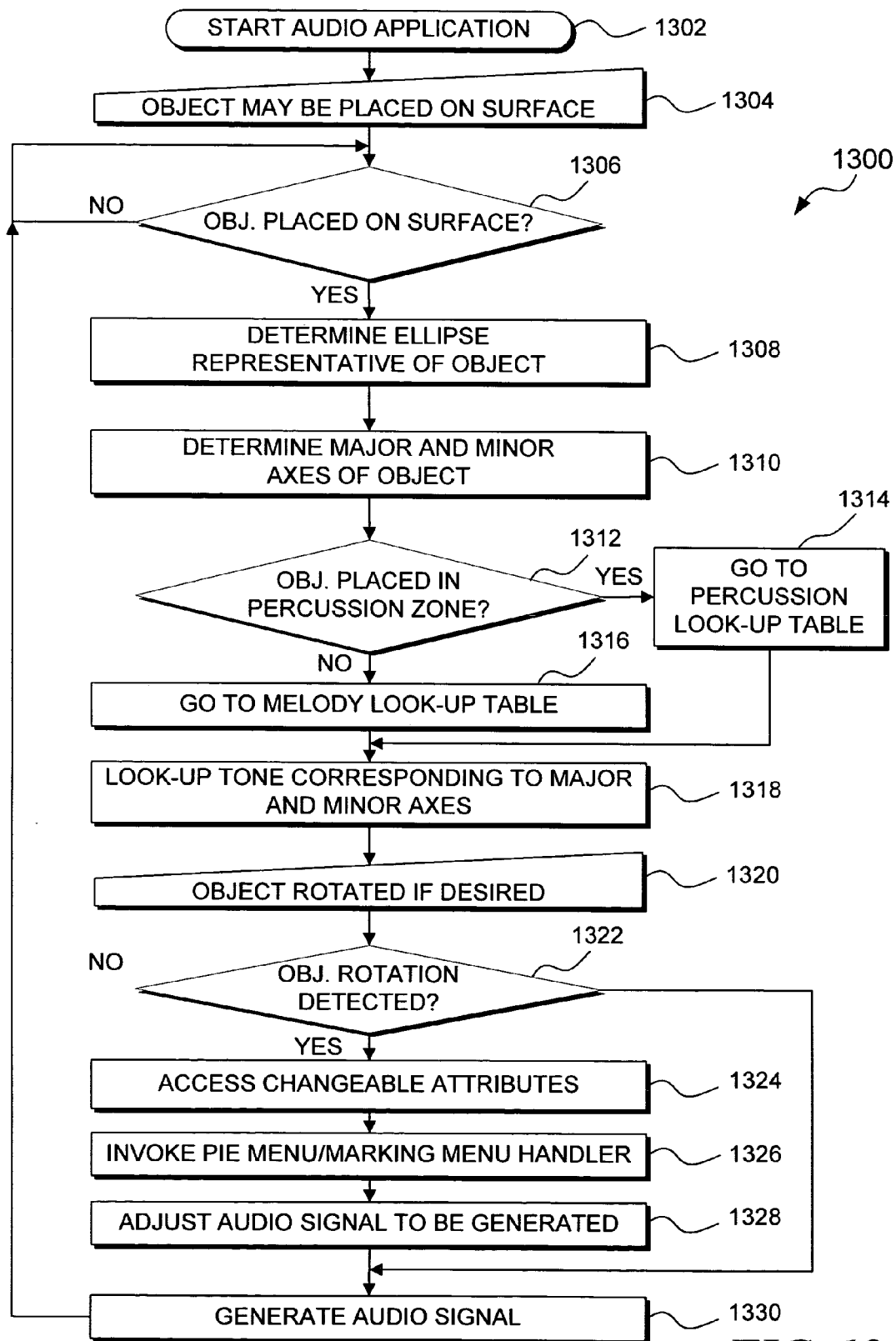

FIGS. 6A-6D schematically illustrate an exemplary embodiment showing how the interactive display surface detects the orientation of a physical object disposed on the interactive display surface and responds to the movements of the physical object over the interactive display surface;

FIGS. 7A-7E illustrate different exemplary applications executing on the interactive display surface and their response to movement of a physical object over the interactive display surface;

FIGS. 8A-8C illustrate an exemplary embodiment of the present invention that employs a physical object to indicate menu choices and adjust application attributes;

FIGS. 9A-9B illustrate additional exemplary embodiments of the present invention in which an application generates and varies one or more audio signals in response to placement and manipulation of a physical object on the interactive display surface;

FIG. 10 is a flow diagram illustrating the logical steps for analyzing and responding to placement of a physical object on the interactive display surface;

FIG. 11 is a flow diagram illustrating the logical steps for changing an application attribute in response to movement of a physical object on the interactive display surface;

FIG. 12 is a flow diagram illustrating the logical steps for implementing a marking menu or pie menu selection in response to movement of a physical object on the interactive display surface; and FIG. 13 is a flow diagram illustrating the logical steps for generating and varying audio signals in response to placement and movement of a physical object on the interactive display surface.

DESCRIPTION OF THE PREFERRED EMBODIMENT

Exemplary Computing System for Implementing Present Invention

Figure 1:
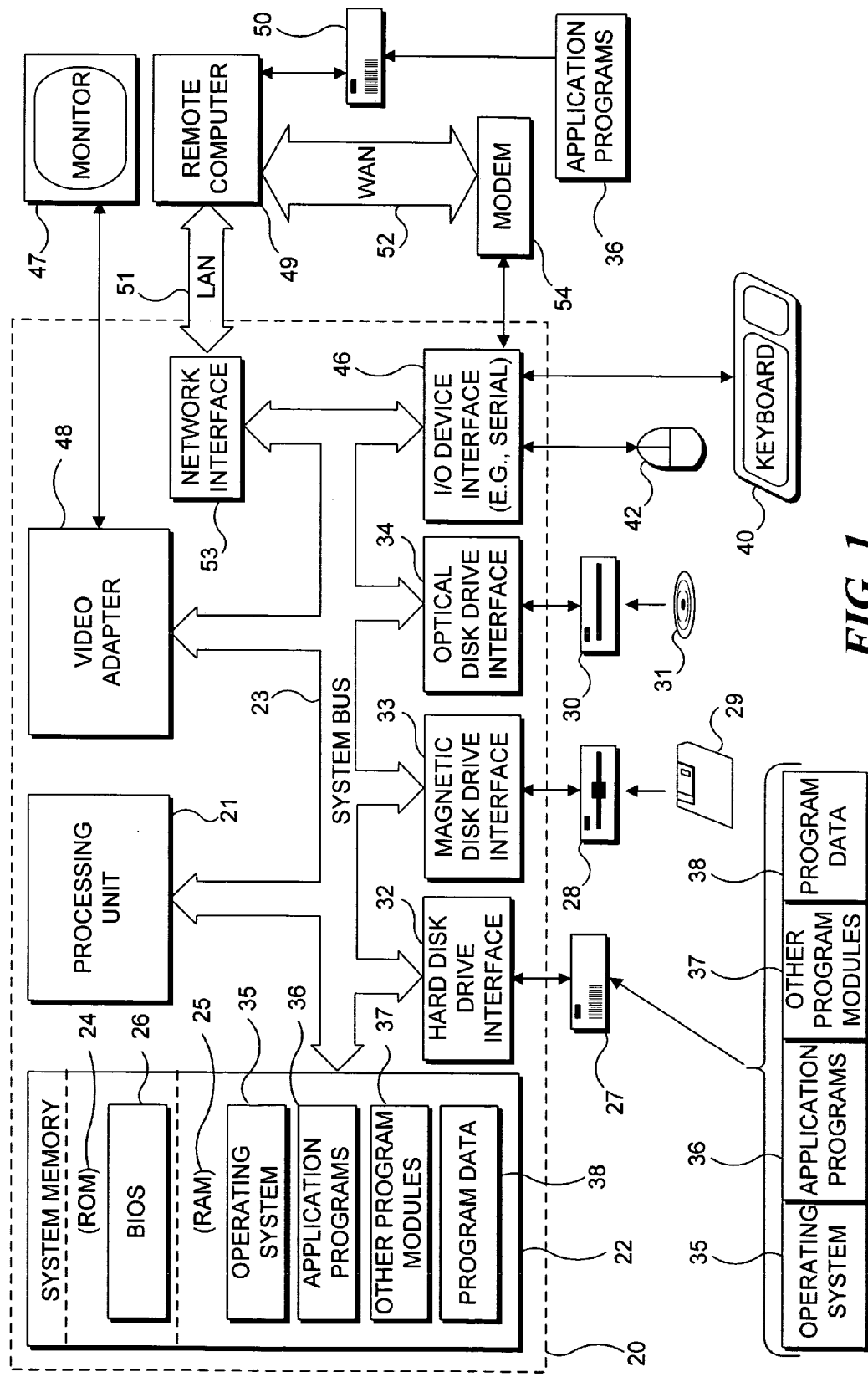
FIG. 1 is a functional block diagram of a generally conventional computing device or personal computer (PC) that is suitable for use with an interactive display surface in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. Also, PC 20 may include a Bluetooth radio or other wireless interface for communication with various types of interface device, such as printers, or the interactive display table of the present invention. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals from a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
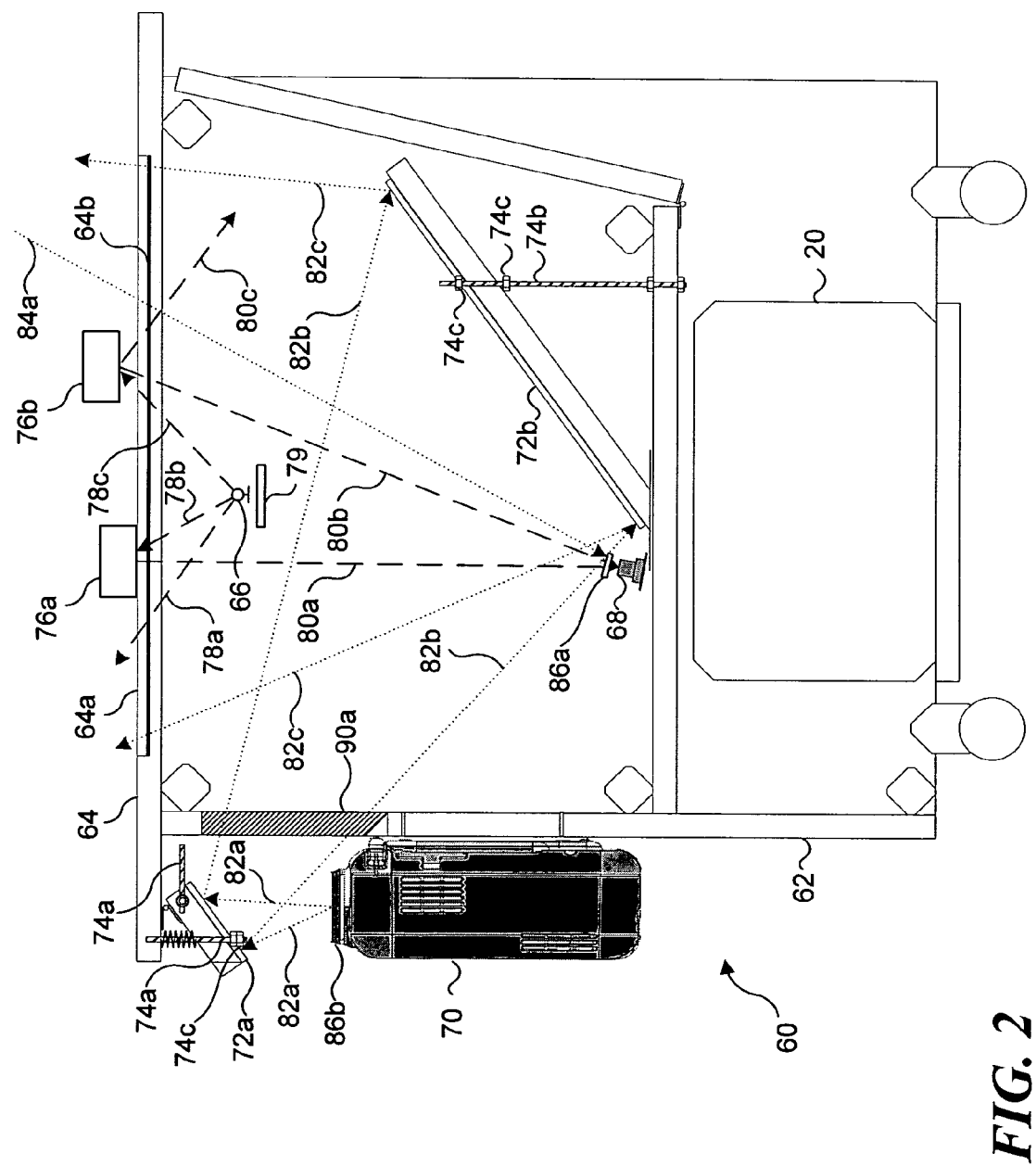
FIG. 2 is a cross-sectional view illustrating internal components of an interactive display surface in the form of an interactive table that includes an integral PC.

In FIG. 2, an exemplary interactive display table 60 is shown that includes the PC 20 within a frame 62 and which serves as both an optical input and video display device for the computer. In this cut-away figure of the interactive display table 60, rays of light 82a-82c used for displaying text and graphic images are generally illustrated using dotted lines, while rays of IR (IR) light used for sensing objects on or just above a display surface 64a of the interactive display table 60 are illustrated using dash lines. The display surface 64a is set within an upper surface 64 of interactive display table 60. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. As used herein and in the claims that follow in connection with objects positioned on or proximate to the interactive display surface, the term "adjacent to" is used with the intention that this term encompass both an object that is actually touching the interactive display surface as well as one that is just above the interactive display surface. Although only one IR source 66 is shown, it will be appreciated that a plurality of such IR sources may be mounted at spaced-apart locations around the interior sides of frame 62 to prove an even illumination of display surface 64a. The IR light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. Thus, both touch and hover objects are "adjacent to" the display surface, as that term is used herein. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. The digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display including ambient IR light that also travels along the path indicated by dotted line 84a.

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects such as hover object 76b that are closer to display surface 64a will reflect more IR light back to digital video camera 68 than objects of the same reflectivity that are farther away from the display surface. The digital video camera 68 senses the IR light reflected from "touch" and "hover" objects within its imaging field and produces a digital signal corresponding to images of the reflected IR light that is input to the PC 20 for processing to determine a location of each such object, and optionally, the size, orientation, and shape of the object. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 68 can also be used for detecting each such specific object, as well as determining its orientation, based on the IR light reflected from its reflective pattern, in accord with the present invention.

Embodiments of the present invention thus are operable to recognize an object and/or its position relative to the interactive display surface 64a by detecting its identifying characteristics using the IR light reflected from the object. The logical steps implemented to thus detect and identify an object and its orientation are explained in the commonly-assigned patent applications, including application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," both of which were filed on Mar. 31, 2004. The disclosure and drawings of these two patent applications are hereby specifically incorporated herein by reference.

Figure 3:
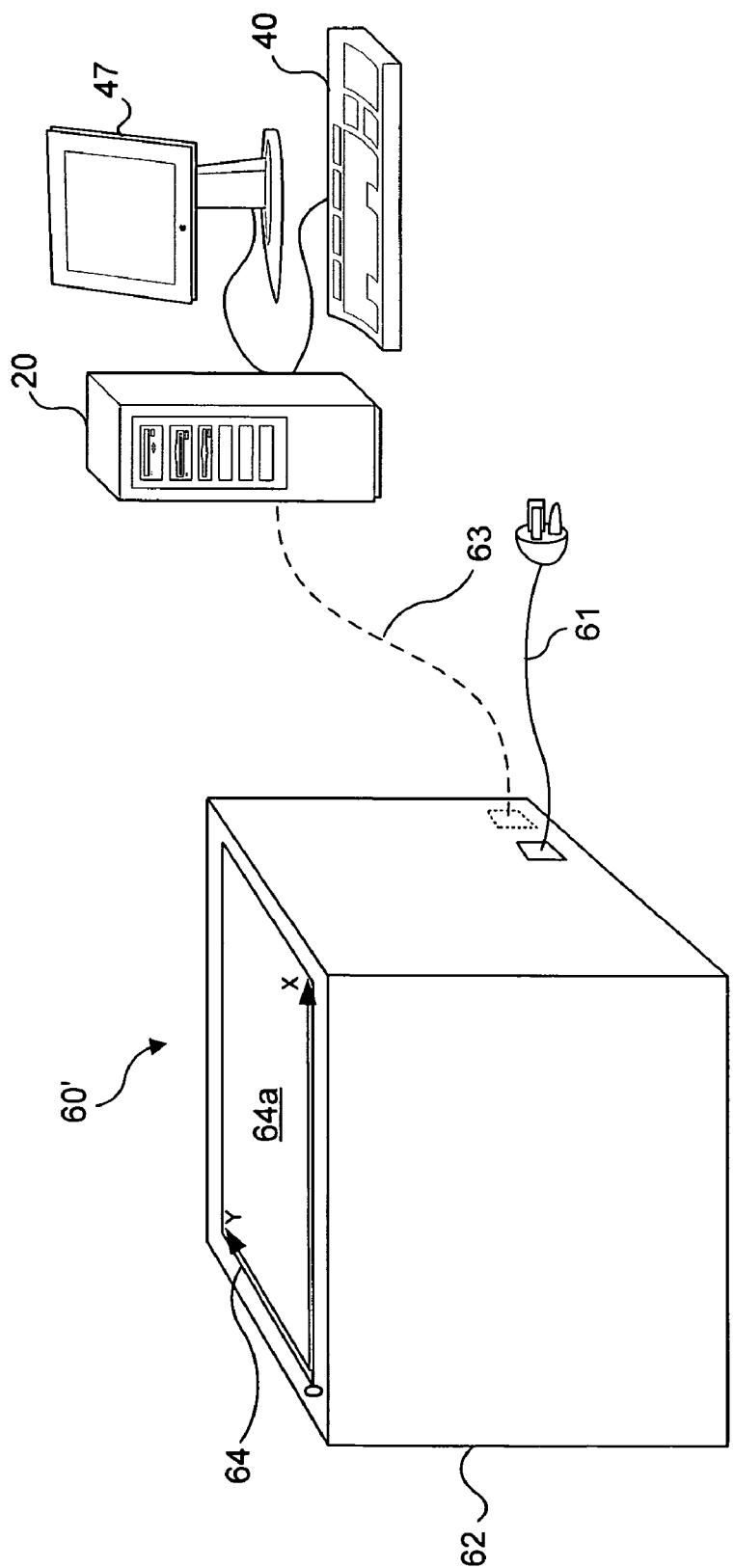
FIG. 3 is an isometric view of an embodiment in which the interactive table is connected to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). Alternatively, external PC 20 can be connected to interactive display table 60' via a wireless link (i.e., WiFi or other appropriate radio signal link). As also shown in this Figure, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If an interactive display table 60' is connected to an external PC 20 (as in FIG. 3) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to employ the more intuitive user interface functionality of interactive display table to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of interactive display table 60 or 60' (i.e., of either of the embodiments of the interactive display table discussed above) is its ability to display graphic images or a virtual environment for games or other software applications and to enable an interaction between the graphic image or virtual environment visible on display surface 64a and identify objects that are resting atop the display surface, such as an object 76a, or are hovering just above it, such as an object 76b.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface.

Figure 4A:
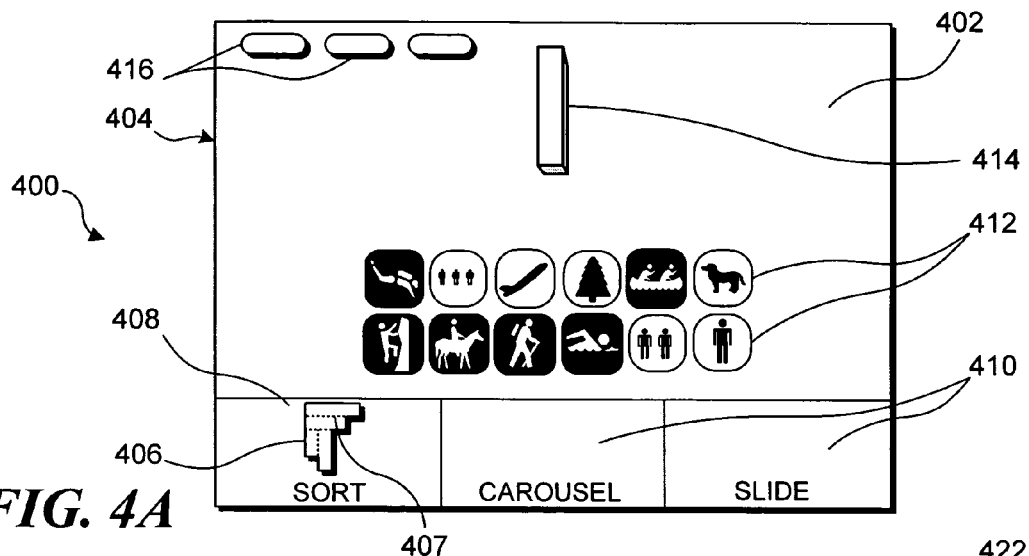
FIGS. 4A-4C illustrate exemplary modes of the interactive display surface in presenting representations of data elements associated with a physical object.

Response of Interactive Display Surface Application to Physical Object Placement In FIG. 4A, an illustration 400 shows an exemplary environment 402 of an interactive display surface 404 of a computer system (not shown) executing a sorting application in response to a physical object 406 being placed on interactive display surface 404. Interactive display surface 404 supports a plurality of interactive applications including, for example, the sorting application, and other applications including, but not limited to, carousel and slideshow applications for displaying images, as described below.

Physical object 406, as can be seen in illustration 400, is an irregular shaped object presenting a surface identifiable by interactive display surface 404 as will be further described below. Physical object 406 is not limited to a particular type of shape, although depending on the process used by interactive display surface to render physical object 406, an object that does not present a perfectly round surface area or an equivalent may be desirable. Physical object 406, for example, might be a group of building blocks such as plastic toy construction blocks, snapped together to form a composite shape, as indicated by dash lines 407, or simply a single object with that shape.

Physical object 406 is disposed in a sort area 408 on interactive display surface 404, sort area 408 being one of a plurality of application selection areas 410 presented by interactive display surface 404. Placement of physical object 406 in sort area 408 directs interactive display 404 to enter a sort mode, although placement of physical object 406 is only one manner in which modes are controllable. Icons, keypads, pointing devices, and other means of user input may alternatively be used to control the operating mode of interactive display surface 402.

In addition, placement of physical object 406 may not only control a mode of operation, but also may control a manner in which the contents of data elements are represented. For one example, in a sort mode where the data elements comprise stored images, a portion of each image or thumbnail representation of the images may be displayed on interactive display surface 404. On the other hand, in a slide show mode that is described below in connection with FIG. 4C, the entire image may be displayed.

Data elements associated with physical object 406 are accessed by interactive display surface 402 identifying a characteristic presented by physical object 406. The characteristic is presented by a shape and/or a resulting general IR reflectivity of the physical object, although other characteristics of an object such as color, a radio frequency emitted by the object, or the object's electromagnetic properties might alternatively be used. The process by which the characteristic and movement of the object are detected by a preferred embodiment of interactive display surface 404 are further described below.

In the sort mode of environment 402, representations 412 are generated to represent data elements being sorted. Representations 412 include all or part of the contents of the data element, a name or icon representing the content of the data element, or another representation. In environment 402, representations 412 include images stored as data elements and associated with physical object 406. The data elements represented in illustration 400 include only images; however, data elements could include text documents, spreadsheet files, and other types of files, as well. Contents of these elements are similarly representable by showing all or part of the content thereof, for example, a first page or first line of a document, a name or title of the document, an icon representing the document, a thumbnail, or another representation.

The sort mode shown is configured for representations 412 to be sorted between physical object 406 and a second physical object 414 with which data elements depicted by representations 412 will be reassociated, as further described below. Once reassociated, data elements depicted by representations 412 will be accessible via second physical object 414, e.g., by placing second physical object 414 in a desired application selection area 410. Second physical object 414 may be placed on interactive display surface 404 at the same time physical object 406 is present on interactive display surface 404. Alternatively, after representations 412 of data elements are retrieved using physical object 406, second physical object 414 may be placed on the interactive display surface to enable data elements depicted by representations 412 to be reassociated with second physical object 414.

Environment 402 also shows control icons 416 arrayed on interactive display surface 404. Control icons 416, which also are described in more detail below, include icons generated on interactive display surface 404, providing access to functions such as "UNDO," "REDO," and "EXIT" that the user may wish to select in the course of the application. Control icons 416 depicted in illustration 400 represent only a few of the control icons, by way of example, that may be presented in connection with an application executing on interactive display surface 404.

As is commonly provided by many computer programs, an "UNDO" function restores the application to a state existing before the last user change was made. Thus, for example, if a user reassociated a data element from physical object 406 to second physical object 414 but then decided that this action was really not desired, selecting the "UNDO" function disassociates the data element from second physical object 414 and reassociates it with physical object 406. The "REDO" function, in effect, undoes an "UNDO" function. Thus, if a user had reassociated a data element from physical object 406 to second physical object 414, selected the "UNDO" function to disassociate the data element from second physical object 414 and reassociate it with physical object 406, then decided that the first action was indeed appropriate, choosing the "REDO" function would once again reassociate the selected data element from physical object 406 to second physical object 414. The "EXIT" function terminates execution of the application.

Figure 4B:
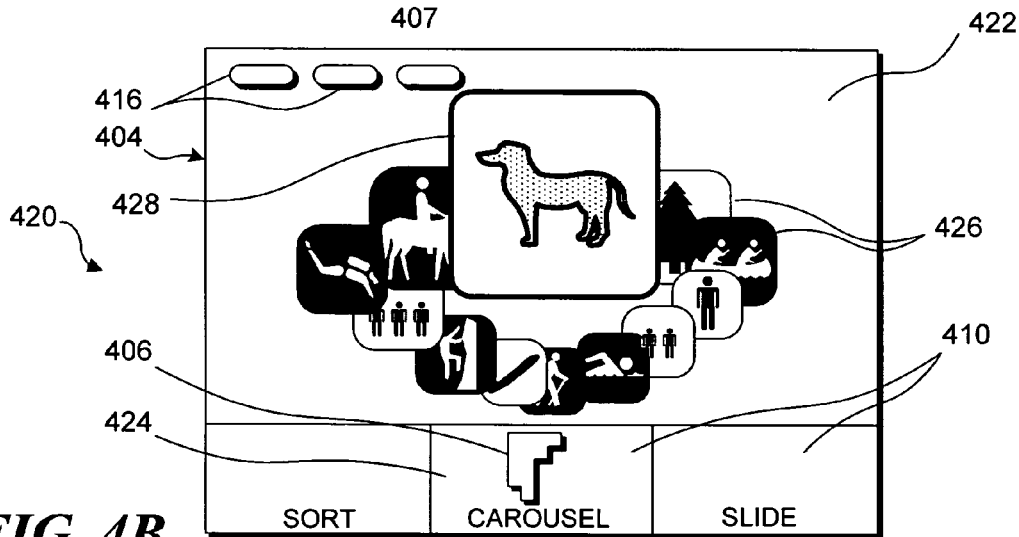

In FIG. 4B, an illustration 420 shows another exemplary environment 422 executing the carousel application. The carousel application, like the sort application, accesses data elements associated with physical object 406. Physical object 406 is disposed in a carousel area 424, which is one of the application selection areas 410 presented by interactive display surface 404. In the carousel mode of environment 422, representations 426 are generated to represent data elements with a principal representation 428 enlarged and highlighted. The carousel mode of environment 422 is well suited to sequencing and re-sequencing representations 426 of data elements, including images for viewing in a slide show application described below. The carousel mode of environment 422 also enables sorting of documents or other data elements, such as might be done for including the data elements in a presentation or a compilation. In addition, the carousel mode of environment 422 may include control icons 416 enabling a user to access "UNDO," "REDO," and "EXIT" functions that the user may wish to exercise in the course of the carousel application.

Figure 4C:
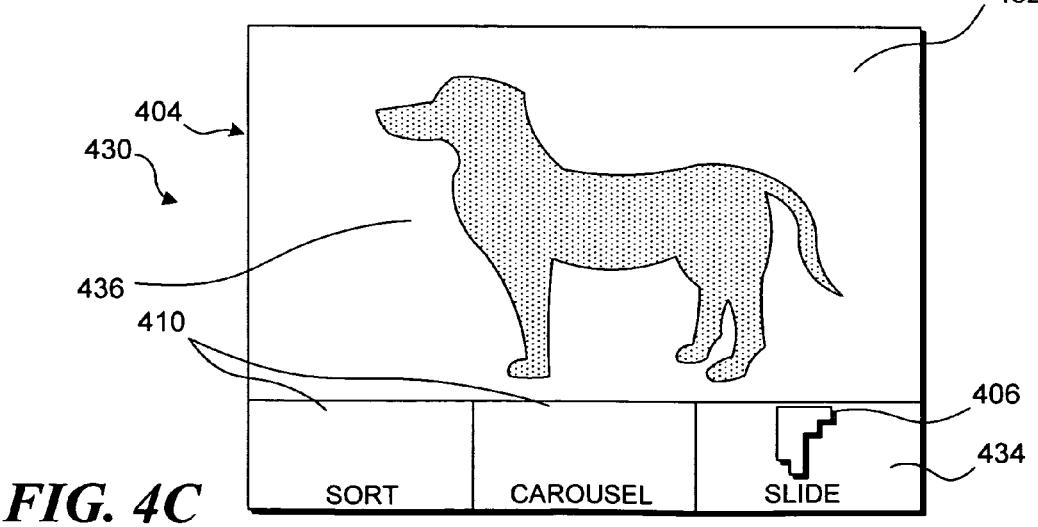

In FIG. 4C, an illustration 430 shows another exemplary environment 432 executing the slideshow application. The slideshow application is launched, among other possible alternatives, by moving physical object 406 into a slideshow area 434, which is one of the application selection areas 410 presented by interactive display surface 404. Once the slideshow application is launched, a single representation 436 of a single data element is presented for viewing or reviewing. As will be understood by those familiar with showing actual photographic slides or with computer applications operable to present a slideshow, such as Microsoft Corporation's POWERPOINT™ program, single representation 436 typically is one in a sequence of representations. Single representation 436 may be one of a plurality of representations associated with physical object 406 in the sort mode (FIG. 4A) and/or sequenced in the carousel mode (FIG. 4C).

Using a slide projector, advancing or reversing is often controlled by a pair of buttons on a projector control pad. Using a slideshow application such as the POWERPOINT™ program, moving forward and backward through the slides or representations is performed using designated keys on a keyboard, such as the Forward and Backward cursor arrow keys, the Up and Down keys, and the Page Up and Page Down keys, and other designated keys, or by using the left and right mouse buttons, respectively. In a slideshow application executing on an interactive display surface 404, control of slides could be implemented with touch-responsive icons comparable to icons 416 described in connection with FIG. 4B. An exemplary embodiment of the present invention provides this control through physical object 406.

Response of Interactive Display Surface to Physical Object and its Movements

Figure 5A:
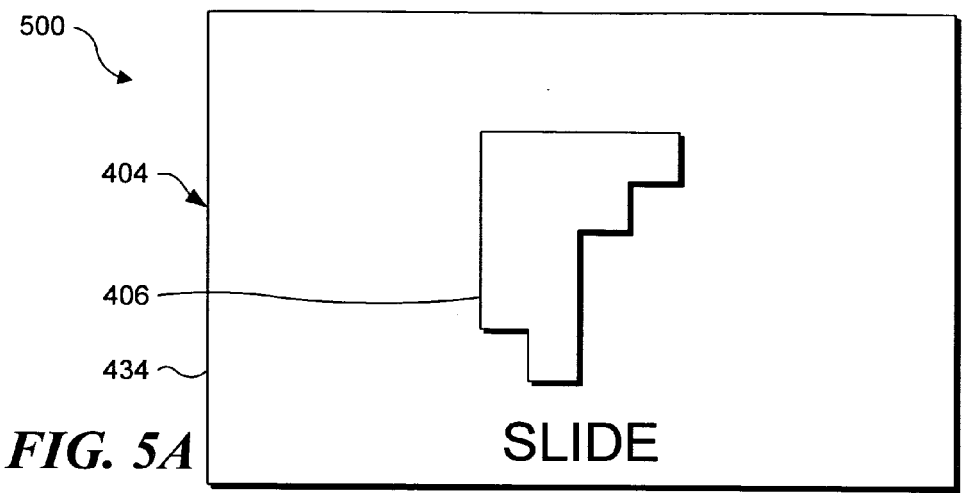
FIGS. 5A-5C illustrate exemplary movements of a physical object on the interactive display surface for providing user input to an application executing on the PC.

In FIG. 5A, an illustration 500 illustrates an enlarged view of physical object 406 placed on interactive display surface 404 within slideshow area 434. As previously described, in the slideshow application, a single representation (not shown in FIGS. 5A-5C) of a single data element is presented for viewing or reviewing—one data element at a time. However, instead of using physical or iconic buttons to move forward or backward through the slides, an exemplary embodiment of the present invention enables the user to move forward and backward by manipulating physical object 406.

Figure 5B:
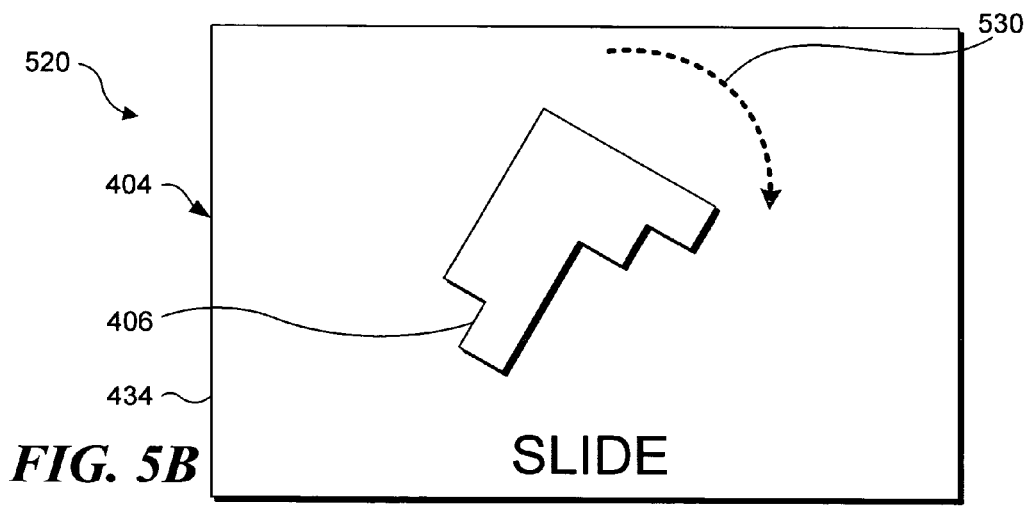

In FIG. 5B, an illustration 520 illustrates physical object 406 being rotated clockwise on interactive display surface 404 in slideshow area 434, as indicated by curved dash line arrow 530. Rotation of physical object 406 in this manner, for example, may cause the next representation or slide to be displayed on interactive display surface 404. Alternatively, this rotation of physical object 406 may cause the slideshow application to begin automatically advancing through a sequence of representations or slides at a speed corresponding to a degree of clockwise rotation of physical object 406 on the interactive display surface. On the other hand, rotating physical object 406 in an opposite direction, for example, may cause the slideshow to move backward one slide, thereby causing the previous representation or slide to be displayed on interactive display surface 404, or may cause the slideshow application to begin automatically reversing through the preceding sequence of representations or slides at a speed corresponding to a degree of counterclockwise rotation of physical object 406.

Figure 5C:
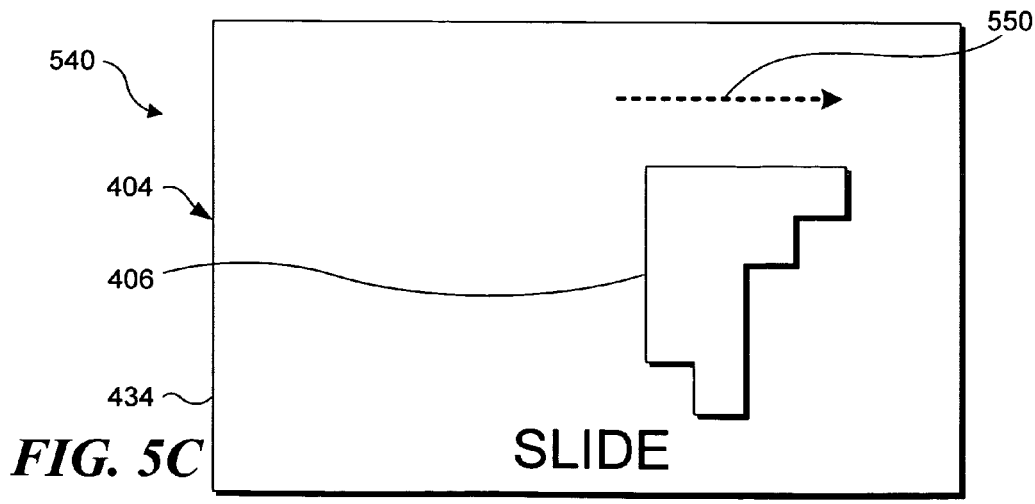

In FIG. 5C, an illustration 540 illustrates physical object 406 being translated to the right on interactive display surface 404 in the slide area 434 as indicated by dash line arrow 550. Translation of physical object 406 in this manner, for example, may cause the next representation or slide to be displayed on interactive display surface 404. Alternatively, the translation of physical object 406 as shown may cause the slideshow application to begin automatically advancing through a sequence of representations or slides at a speed corresponding to an extent of rightward translation of physical object 406. On the other hand, translating physical object 406 in an opposite direction, for example, may cause the slideshow to move backward one slide, thereby causing the previous representation or slide to be displayed on interactive display surface 404, or may cause the slideshow application to begin automatically reversing through the preceding sequence of representations or slides at a speed corresponding to an extent of leftward translation of physical object 406.

The correspondence of the representations or slides moving forward or backward with a particular movement of physical object may be user selectable or predetermined in the slideshow application or other application. Thus, clockwise rotation of physical object 406 as shown in FIG. 5B or rightward translation of physical object 406 as shown in FIG. 5C may cause representations or slides to move forward and vice versa. Furthermore, different movements of physical object 406 are made to suitably correspond with different functions. Thus, for example, clockwise rotation of physical object 406 as shown in FIG. 5B may cause the slides or representations to advance forward by one, whereas rightward translation of physical object 406 as shown in FIG. 5C may result in the representations or slides beginning to advance automatically at a speed corresponding to the extent of rightward translation. The present invention is therefore not limited to a particular type of motion only being associated with a particular program control function.

Detection of Physical Object and its Movements by Interactive Display Surface

Figure 6A:
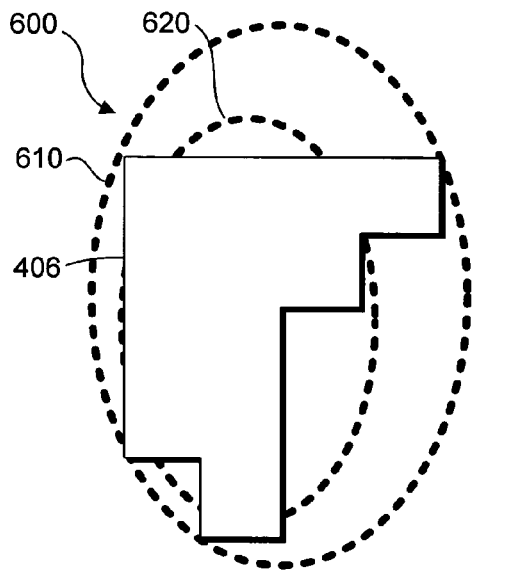

In FIG. 6A, an illustration 600 illustrates an exemplary manner by which the interactive display surface detects physical object 406 and its movements. Pixels comprising an image of at least a portion of the face of physical object 406 proximate to the interactive display surface are detected in a signal produced by IR digital video camera 68 (FIG. 2) based upon the IR light reflected back from the physical object through the interactive display surface 64a (FIG. 2). The signal produced by the IR digital video camera is processed to identify pixels having an intensity above a predefined threshold that is set to disregard ambient IR or extraneous IR light reflections. An invention describing how objects or patterns on objects (like physical object 406) are detected is described in co-pending U.S. patent application Ser. No. 10/814,761, entitled "Determining Connectedness And Offset Of 3D Objects Relative To An Interactive Surface," which was filed on Mar. 31, 2004.

In one embodiment of the present invention, physical object 406 is represented as an equivalent ellipse, based upon the pixels that are above the predefined threshold and generally lie within the equivalent ellipse. With sufficient processing capability, all points or pixels corresponding to the face of physical object 406 that is proximate or in contact with the interactive display surface can be plotted and re-plotted as physical object 406 moved in order to determine movement of physical object 406, as described above in connection with FIGS. 5A-5C. While rendering physical object 406 using an equivalent ellipse sacrifices some granularity that may distinguish between nearly equivalent shapes, use of the equivalent ellipse simplifies the processing required to track movement of physical object 406 as it is translated and/or rotated relative to the interactive display surface.

Illustration 600 shows two of the possible equivalent ellipses 610 and 620 that may be used as representations of physical object 406. More specifically, illustration 600 includes a first ellipse 610 having dimensions large enough to encompass outermost points of a face of physical object 406 that is proximate to or in contact with the interactive display surface. Outermost points of physical object 406 are those points at a periphery of a group of immediately adjacent points or pixels having a degree of IR reflectance determined to signify that the points or pixels are part of the same object, i.e., that the points or pixels are connected, as evidenced by their proximity to each other.

Whether the points or pixels are immediately adjacent to each other may be determined as a function of whether, for each point, there are points having the same IR reflectance adjacent to the point in each considered direction. For example, a connectedness algorithm may evaluate whether each point is four-way connected in that the algorithm determines if each point or pixel is adjacent to points or pixels having an IR reflectance above the predefined threshold, in both horizontal and vertical directions. Alternatively, as another example, a connectedness algorithm can evaluate whether each point or pixel is eight-way connected to determine if each point or pixel is adjacent to other points or pixels having a reflectance above the predefined threshold, horizontally, vertically, and at both diagonals across the horizontal and vertical axes.

The dimensions of ellipse 610 will vary according to the dimensions of physical object 406. It should be noted that a number of different physical objects can potentially be represented by ellipse 610, and that any objects having the same outermost dimensions (even if slightly different shape) may be represented with the same ellipse.

Alternatively, instead of using ellipse 610 that surrounds outermost points of physical object 406, a second ellipse 620 is derivable from physical object 406 according to spatial moments of all immediately adjacent points or pixels determined to be part of physical object 406. A two-dimensional shape such as physical object 406 is representable as an ellipse 620 such that points or pixels encompassed by the ellipse have the same variance from a central point or pixel. The central point is determinable by collecting horizontal and vertical coordinate positions of all those points pixels determined to be connected, as described above, and then calculating a mean horizontal and a mean vertical position to determine a spatial center of the connected points.

Relative to the central points or pixel, each of the connected points or pixels has a spatial moment about the central point or pixel determined by its relative coordinate position to the spatial center. For example, where the spatial center is determined to be a point lying at coordinates $\bar{x}$, $\bar{y}$, the spatial moment of each point is determined by Eq. (1), (2), and (3), which determine horizontal variance, vertical variance, and an orientation variance from the central point $\bar{x}$, $\bar{y}$, respectively:

$$\mu_{xx} = \frac{1}{A} \sum (x - \bar{x})^2 \qquad (1)$$

$$\mu_{yy} = \frac{1}{A} \sum (y - \bar{y})^2 \qquad (2)$$

$$\mu_{yx} = \frac{1}{A} \sum (y - \bar{y})(x - \bar{x}) \qquad (3)$$

An equivalent ellipse having equivalent moments reflecting both the size and orientation of the physical object represented by the equivalent ellipses is defined by Eq. (4), as follows:

$$R = \{(y,x): dx^2 + 2exy + fy^2 \leq 1\} \qquad (4)$$

where coefficients determining the ellipse are related to the spatial moments of the points by Eq. (5), as follows:

$$\begin{pmatrix} d & e \\ e & f \end{pmatrix} = \frac{1}{4\mu_{xx}\mu_{yy} - \mu_{yx}^2} \begin{pmatrix} \mu_{yy} & -\mu_{yx} \\ -\mu_{yx} & \mu_{xx} \end{pmatrix} \qquad (5)$$

Thus, ellipse 620, which is representative of the size and orientation of physical object 406, can be determined from Eq. (4) and (5). From Eq. (4), changes in orientation of ellipse 620 can be determined to determine changes in orientation of physical object 406.

The dimensions of ellipse 620, like the dimensions of ellipse 610, will vary according to the dimensions of physical object 406. Also similar to ellipse 610, a number of different physical objects can potentially be represented by ellipse 620. However, because the sizes and orientations of ellipses 610 and 620 will change for each of many different objects, representing physical object 406 by an equivalent ellipse sufficiently distinguishes between types of objects to facilitate operation of the present invention.

Figure 6B:
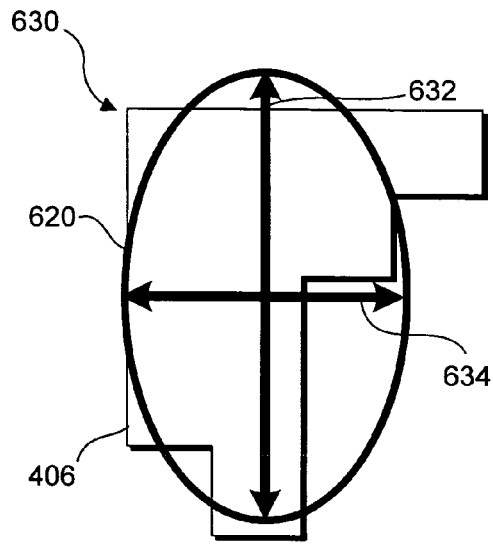

Illustration 630 of FIG. 6B shows that an ellipse used to represent physical object 406, such as ellipse 620, features a major axis 632 defining a longer dimension of ellipse 620, and a minor axis 634 defining a shorter dimension of ellipse 620. Major axis 632 and minor axis 634 are measurable by the interactive display surface and/or can be calculated by an equation defining ellipse 620, such as Eq. (4). The dimensions of major axis 632 and minor axis 634 provide a convenient way to assess sizes and shapes of physical objects placed on the interactive display surface that can be used by applications executing on the interactive display surface. An exemplary use of the major axis 632 and minor axis 634 dimensions is described below in connection with FIGS. 9A-9B.

Figure 6C:
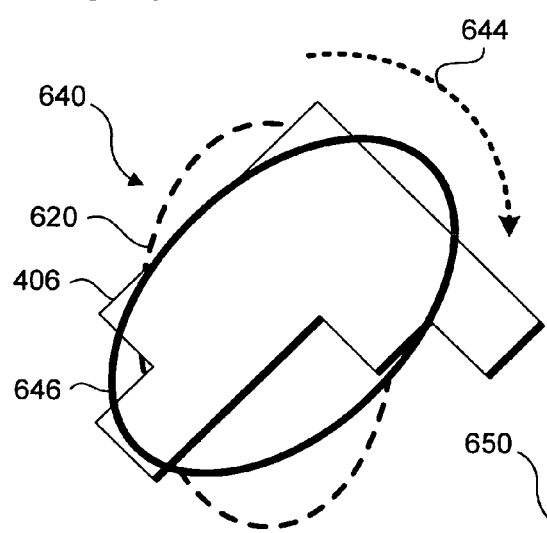
Figure 6D:
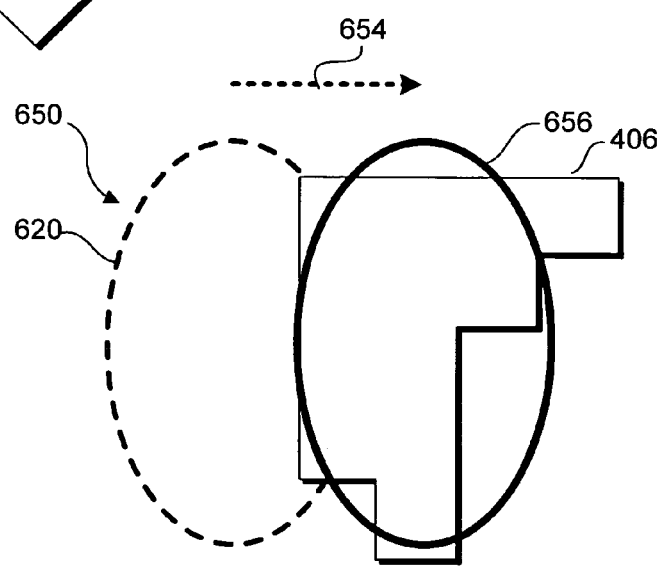

Illustration 640 of FIG. 6C indicate how rotation of physical object 406 is represented in terms of its representative equivalent ellipse. As originally placed on the interactive display surface, physical object 406 was represented by equivalent ellipse 620. However, rotating physical object 406 in the direction of arrow 644 results in a new representative equivalent ellipse 646. The change from equivalent ellipse 620 to equivalent ellipse 646 is derivable from Eq. (4). By contrast, illustration 650 of FIG. 6D represents how translation of physical object 406 in the direction of arrow 654 causes equivalent ellipse 620 to be replaced by equivalent ellipse 656. As physical object 406 is translated, representative equivalent ellipse 656 has the same size and orientation of equivalent ellipse 620, but representative equivalent ellipse 656 is displaced along the interactive display surface in the direction and to the extent by which the physical object is translated. Embodiments of the present invention can be configured to respond to both types of motion, and to respond differently to rotation and translation of physical object 406, as is described below.

Response of Applications to Movement of Physical Object

Figure 7A:
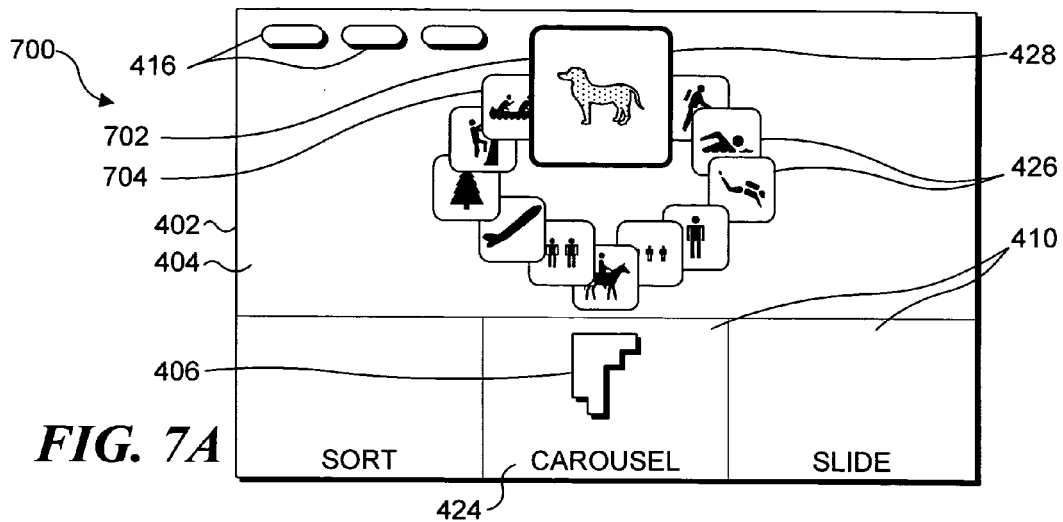
Figure 7B:
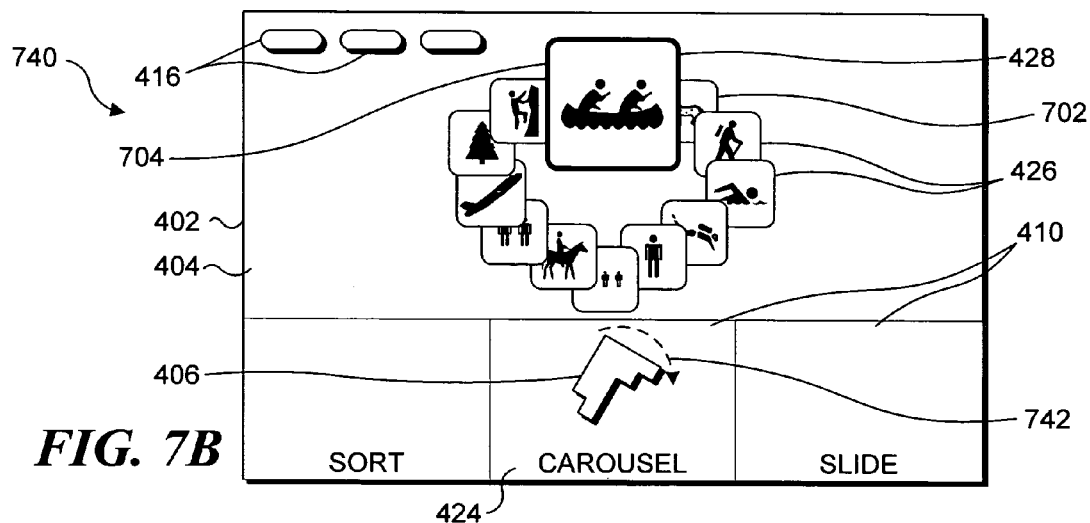

FIGS. 7A-7B illustrate a response of the carousel application of FIG. 4B to placement and movement of physical object 406. As described above, the carousel application accesses data elements associated with physical object 406. Physical object 406 is disposed in carousel area 424 to activate the carousel mode of environment 422, in which representations 426 are generated to represent data elements. A principal representation 428 is enlarged and highlighted.

More specifically, illustration 700 of FIG. 7A shows a response of the carousel application when physical object 406 is initially placed in carousel area 424. Illustration 740 of FIG. 7B shows a response of the carousel application to the physical object 406 being rotated several degrees in a clockwise direction, as shown by arrow 742. Rotation of physical object 406 as indicated by dash line arrow 742 causes the carousel of representations 426 to rotate in a clockwise direction. In illustration 700 of FIG. 7A, principal representation 428 was representation 702. By contrast, in illustration 740 of FIG. 7B, an illustration 704 has been rotated to the forefront to become principal representation 428. The carousel of representations 426 rotated in response to the movement of physical object 406.

It should be noted that representations 426 may rotated in response to movement of physical object 406 in a number of ways. For example, the carousel of representations 426 may be linked to an orientation of physical object 406 such that as physical object is rotated by a number of degrees, the carousel of representations 426 would rotate the same number of degrees. Put another way, if physical object 406 is rotated ninety degrees clockwise, representations 426 correspondingly rotate ninety degrees clockwise about the carousel. Alternatively, rotation of physical object 426 may be correlated to a speed of automatic rotation of representations 426 about the carousel. Thus, rotating physical object 406 a few degrees in a clockwise direction can cause representations 426 to begin rotating in a clockwise direction at a speed associated with the angular orientation of physical object. If physical object 406 is rotated further in the clockwise direction, representations 426 will then rotate at a faster speed. It will be appreciated that, in either mode, rotating physical object 406 in a counterclockwise direction will have an opposite effect to rotating physical object 406 in a clockwise direction. It also should be appreciated that, in a slideshow mode as shown in illustration 430 of FIG. 4C, rotating physical object 406 would similarly cause the representations to be successively displayed as the single slide 436 represented on interactive display surface 404

Figure 7C:
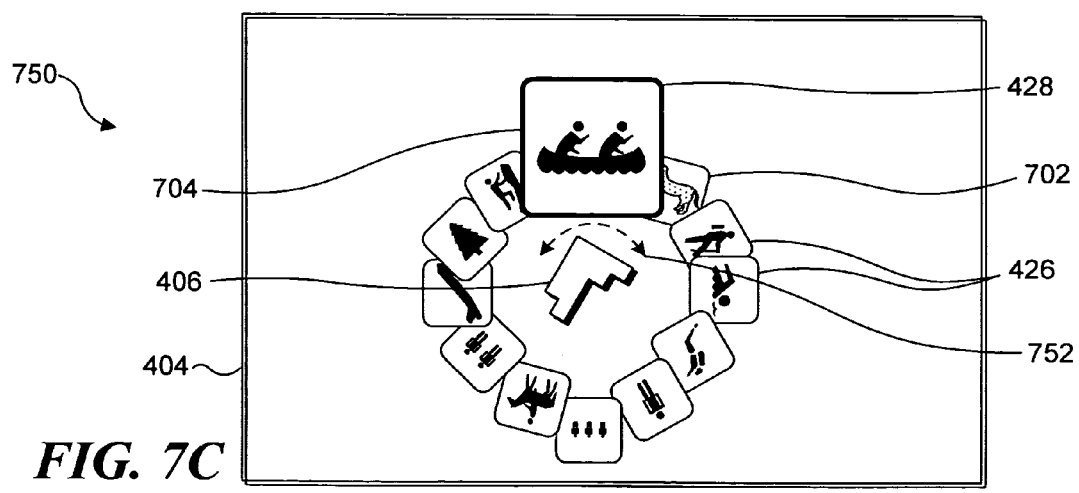

Illustration 750 of FIG. 7C shows a variation of the carousel application and its response to physical object 406. Instead of placing physical object 406 in an application selection area 410, interactive display surface 404 is configured to generate a carousel of representations 426 around physical object 406 wherever physical object 406 is placed on interactive display surface 404. Representations 426 are rotated around the carousel, including to the position of principal representation 428, in response to rotation of physical object 406 clockwise or counterclockwise, as indicated by dash line arrow 752. It should be noted that representations 426 may be oriented in a right-side-up fashion relative to interactive display surface 404, as shown in illustrations 700 and 740 of FIGS. 7A-7B, respectively. In this option, the representations are always oriented with their bottom edge directed in the same direction as the bottom edge of the principle representation. Alternatively, representations 426 may be oriented as shown in illustration 750 of FIG. 7C, with their bottom edge directed inwardly along a radius extending outwardly from physical object 426, so that representations 426 are displayed in a "fan wheel."

Use of a physical object to interact with and control operation of application executing on an interactive display surface are not limited to applications involving only still images or other static data representations. Illustrations 760 and 780 of FIGS. 7D-7E, respectively, show a motion-video application executing on interactive display surface 404 and responding to movements of physical object 406.

Figure 7D:
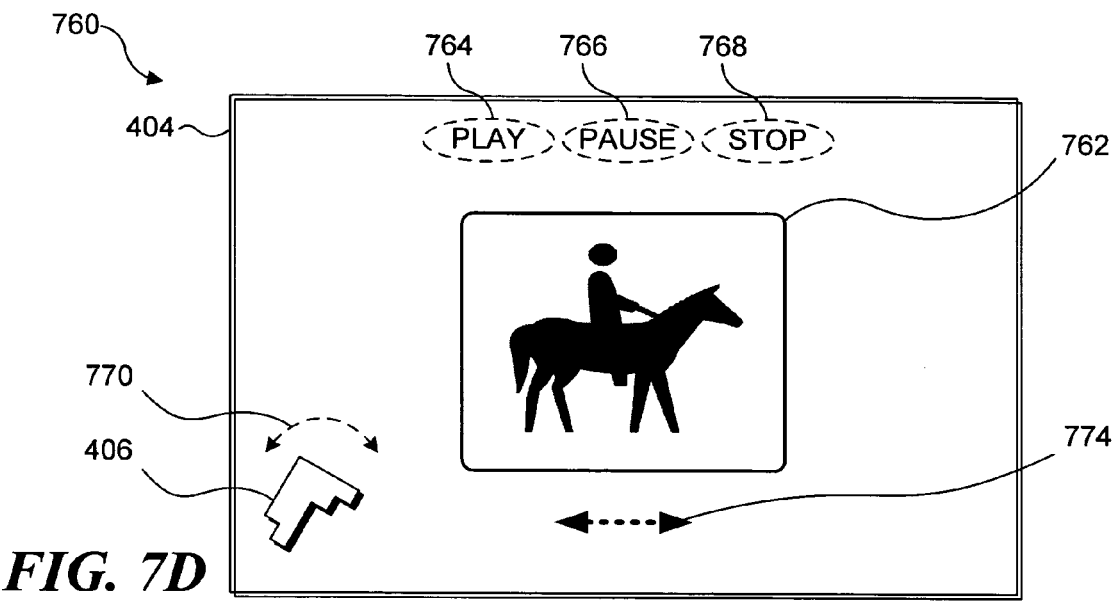

More particularly, illustration 760 of FIG. 7D shows a full-motion video 762 being presented on interactive display surface 404. The full-motion video is controlled, at least in part, by movement of physical object 406. A plurality of control icons or virtual buttons 764-768 are generated by the PC coupled to the interactive display surface. Virtual buttons 764-768 respond to a user touching them with a physical object, such as the user's hand. Virtual buttons include a play icon 764, a pause icon 766, and a stop icon 768. Operation of such controls is familiar to those who have used tape recorders, videotape recorders, or caincorders. Typically, these familiar devices also may include rewind, fast-forward, frame advance, and fast play buttons. For controlling the full motion video on the interactive display surface, the functions of these buttons can be replaced by selectively making different defined movements with physical object 406.

As previously described in connection with FIGS. 7B and 7C, rotation of physical object 406 is detected by interactive display surface 404. In illustration 760, rotation of physical object 406 as indicated by a dash line arrow 770 in a clockwise or counterclockwise direction causes the full-motion video 762 to fast-forward or rewind, respectively. A greater degree of rotation of physical object as indicated by dash line arrow 770 varies the speed of the fast-forwarding or rewinding, depending on the direction of the rotation of the physical object. A dash line arrow 774 figuratively represents forward and backward playback speeds corresponding to the extent of rotation of physical object 406 in the directions of dash line arrow 770. On some videocassette recorders, rotating a knob to control full-motion video playback is provided and is known as a "jog control." Rotation of physical object 406, which may be a common or irregular household object, enables the same jog-control functionality on interactive display surface 404.

Figure 7E:
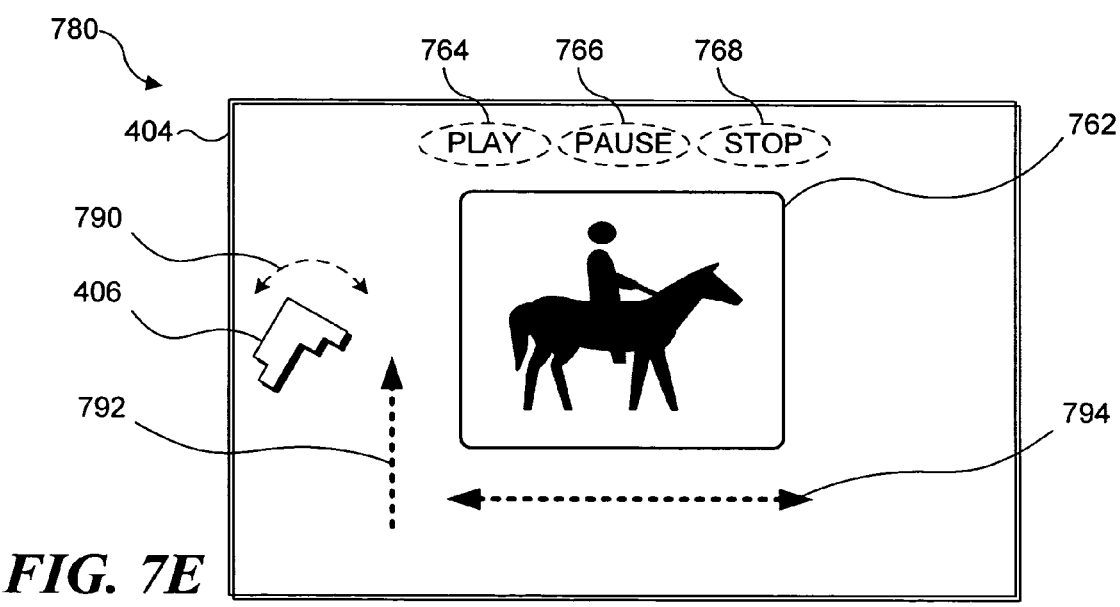

Moreover, interactive display surface 404 also can respond to translational movement of physical object 406, providing improved additional functionality beyond the rotational control of fast forward or rewind. An illustration 780 of FIG. 7E shows physical object 406 as being rotatable as indicated by a dash line arrow 790 and translated, as indicated by a dash line arrow 792. In the exemplary embodiment depicted in illustration 780, translation of physical object 406 in the direction of arrow 792 implies a scaling factor for adjusting a response of interactive display surface 404 to the rotation of physical object 406. Thus, translating the physical object upwardly increases the scaling factor, and thus increases the effect of a rotation of the physical object. Like dash line arrow 774 of illustration 760, a dash line arrow 794 of illustration 780 indicates forward and backward playback speeds of full-motion video 762 corresponding selected in response to the degree of rotation of physical object 406. In illustration 780, however, the increase in the scaling factor caused by translation of physical object 406 in the direction of dash line arrow 792 is applied to the rotation of physical object 406 in the direction of dash line arrow 790. As a result, the speed of forward and backward playback speeds in response to rotation of physical object 406 is increased, as figuratively indicated by the greater length of arrow 794 of illustration 780 as compared to arrow 774 of illustration 780. Thus, embodiments of the present invention enable a common or irregular object to be used to provide scalable "jog control" of full-motion video, as well as controlling fast forward and rewind of the full-motion video.

Use of Position and/or Rotation of Physical Object to Select Menu Options

FIGS. 8A-8C illustrate an exemplary embodiment of the present invention enabling a physical object to be used to indicate menu choices to adjust application attributes or otherwise interact with an application. FIGS. 8A-8C also illustrate how combinations of rotation and translation of a physical object are used to interact with an interactive display surface.

Illustration 800 of FIG. 8A shows physical object 406 placed on interactive display surface 406. Presented by interactive display surface 404 in a radial array around physical object 406 is a top-level menu 802 including top-level menu options 804, 806, and 808 in a pie menu or marking menu arrangement. Top-level menu options 804, 806, and 808 include "carousel," "fan wheel," and "slide show," respectively, and correspond to representation-viewing applications described in connection with FIGS. 4B, 4C, and 7A-7C. The representation viewing application generating the top-level menu 802 and top-level menu options 804, 806, and 808 may have been launched in response to physical object 406 being placed on interactive display surface 404, selected from a previous menu (not shown) using physical object in a manner described below, by entering choices on a keyboard or another input device, or with another user input device.

In one embodiment of the present invention, to select from among the top-level menu options 804, 806, and 808, physical object 406 is translated to be disposed over the desired top-level menu choice. As shown in an illustration 840 of FIG. 8B, physical object 406 has been translated downwardly (from its position in FIG. 8A), so that it is now over a top-level menu choice 806, which is "slide show." Once top-level menu choice 808 is selected, a visual confirmation 841, in this case in the form of an outline appearing around the selected top-level menu choices 806, appears. Also, in a manner that will be intuitive and familiar to users of typical computer applications that include hierarchical menus, once top-level menu choice "slide show" 808 is selected, a next-level menu 842 is presented by interactive display surface 404. Next-level menu 842 includes attribute options related and subsidiary to top-level menu choice 808. More particularly, next-level menu 842 includes a photo display time option 844 and a fade speed option 846, that can employed to control operation of the "slide show" option that is represented by top-level menu choice 808.

An illustration 860 of FIG. 8C shows physical object 406 translated once more to select a next-level menu choice, which, in this case, is the fade speed option 846. Just as visual confirmation 842 indicated selection of top-level menu choice 808, selection of fade speed option 846 causes a visual confirmation 862 to be presented around the selected fade speed option 846. In addition, an application attribute 864 is displayed, which in this example, indicates a current fade speed of 2 seconds. It should be noted that only application attribute 864 associated with fade speed option 846 is displayed, rather than another menu. Thus, instead of translating physical object 406 to make another choice, physical object 406 is rotated to change the value of application attribute 864. Rotating physical object 406, as indicated by an arrow 866, changes the value displayed for application attribute 864. The user thus rotates the physical object to select a desired value for the attribute. The user can finalize the selection by translating physical object 406 away from the next-level menu choice of fade speed 846 or otherwise signaling that the desired attribute value has been set. Thus, with a combination of translating and rotating an ordinary physical object 406, a user can effectively easily select and control software application options displayed on interactive display surface.

Position and/or Rotation of Physical Objects for Controlling Other Applications

FIGS. 9A-9B illustrate additional exemplary embodiments of the present invention. In the embodiments of illustrations 900 and 950 of FIGS. 9A and 9B, respectively, an application executing on interactive display surface 404 generates audio signals in response to one or more physical objects being placed on the interactive display surface. Where a physical object is placed and how it is moved may be used to change the audio signals generated.

In illustration 900 of FIG. 9A, interactive display surface presents a recording command area 902, a tone generation area 904, and an attribute control area 906. Recording command area 902 facilitates recording and playback of a collection of audio signals and includes a plurality of control icons or buttons 910-920 that are presented by interactive display surface and respond to a user touching them with a physical object, such as the user's hand. The control icons include a rewind icon 910, a play icon 912, a pause icon 914, a stop icon 916, a record icon 918, and a fast forward icon 920. Operation of such controls will be familiar to those who have used tape recorders, videotape recorders, or camcorders. These controls enable a user to control how input is recorded and control playback of previously recorded material.

Tone generation area 904 is a region of interactive display surface 404 designated to respond to shapes of physical objects placed therein. As previously described, particularly in connection with FIGS. 6A-6D, interactive display surface responds to the shape and/or the orientation of physical objects placed on interactive display surface 404. In this exemplary embodiment, objects such as rectangular object 922 are placed on interactive display surface 404 in tone generation area 904. A shape of rectangular object 922 is detected, as described above. Using a representative equivalent ellipse, major and minor axes of rectangular object 922 are determined. A tone is generated using an arithmetic function that weights and combines values of the major and minor axes. Alternatively, a look-up table can be accessed. The look-up table has dimensions for each axis, and a tone is associated with each intersection in the table. As a result, rectangular physical object 922 may cause a tone having a first voice to be generated, while placing rectangular object 922 on interactive display surface 204 may cause a tone in a second voice to be generated. The size, shape, and orientation of objects placed on interactive display surface 404 may result in a multitude of different tones being produced. It is also contemplated that the voice generated may change under the control of the user when physical objects are rotated and translated on interactive display surface 404.

One or more aspects of the audio signal generated may be changed using the attribute control area 906. In the embodiment shown in illustration 900 of FIG. 9A, a second physical object 940 is placed in one of attribute areas 907, which include a volume area 932, a pitch area 934, a sustain area 936, and a repeat area 938. By placing second physical object 932 in one of attribute areas 907, a user can change a respective attribute of the tone generated by rectangular physical object 922. Using recording command area 902, audio signals generated can be stored and subsequently played back.

Illustration 950 of FIG. 9B shows an alternative embodiment of an environment for generating audio signals based on sizes, shapes, and orientations of physical objects placed on interactive display surface 404. In the embodiment of illustration 950, the interactive display surface again includes a recording command area 952 having a rewind icon 954, a play icon 956, a pause icon 958, a stop icon 960, a record icon 962, and a fast forward icon 964.

A tone generation area 970 is divided into percussion region 974 and a melody region 976. A physical object may be placed in either of these two regions. In the illustrated example, a rectangular physical object 990 is placed in percussion region 974 and an irregular shaped physical object 992 is placed in melody region 976. A tone is generated using an arithmetic function that weights and combines values of the major and minor axes for ellipses representative of shapes 990 and 992, or a look-up table can be accessed, wherein the look-up table has dimensions for each axis and a tone is associated with each intersection in the table. In the embodiment shown in illustration 950, however, a different function or look-up table is used for each of percussion and melody regions 974 and 976, so that a percussive sound is generated relating to the shape of rectangular shape 990 and a melodic sound is generated relating to the shape of irregular shape 992.

Instead of including an attribute control area 906 (FIG. 9A) as in the embodiment of illustration 900, in this embodiment, attributes are controllable by manipulating any shapes placed in the tone generation area. A pie menu or marking menu is presented when such a shape is detected therein, as described in connection with FIGS. 8A-8C. Attributes choices 980, 982, 984, and 986, which respectively represent volume, pitch, sustain, and repeat, are then presented by interactive display surface 404 in a radial array around physical objects 990 and 992. These attributes are manipulated by translating physical object 990 and/or 992 to the desired attribute and then rotating the physical object as described in connection with FIGS. 8A-8C, to change the value of the selected attribute.

Logical Steps for Responding to Movement of Physical Object

FIG. 10 is a flow diagram 1000 illustrating the logical steps for detecting and responding to placement and movement of a physical object on the interactive display surface. Flow diagram 1000 describes a general methodology according to one embodiment of the present invention, when one or more physical objects are disposed on the interactive display surface. The flow diagrams of FIGS. 11-13 describe methodologies relating to specific applications that were described above.

A process described by flow diagram 1000 begins at a step 1002 to initiate detection of physical object. At a step 1004, a user places a physical object on the interactive display surface. At a step 1006, connected components comprising pixels identified as being adjacent to each other are detected, as described in connection with FIG. 6A. The adjacent pixels comprising the connected component will be regarded by the interactive display system as representing a physical object. As also described in connection with FIG. 6A, at a step 1008, a statistical center of the adjacent pixels is determined. Next, at a step 1010, in accordance with one embodiment of the present invention, statistical moments of the adjacent pixels identified as part of the physical object are determined. A step 1012 indicates that the statistical moments are used to determine the shape, size, and orientation of an equivalent ellipse that is representative of the physical object.

A decision step 1014 determines if a particular application is associated with the equivalent ellipse that is representative of the physical object. If so, at a step 1016, the application associated with the physical object is launched. Examples of a method and system for launching an application according to a shape of a physical object are described in commonly assigned, co-pending U.S. patent application Ser. No. 10/839,668, entitled "Invoking Applications With Virtual Objects On An Interactive Display," filed on May 5, 2004. If it is determined at decision step 1014 that no application is associated with the physical object, it is assumed the application will otherwise be launched.

Next, a decision step 1018, determines if data are associated with the equivalent ellipse representative of the physical object. If so, at a step 1020, the data associated with the physical object are retrieved using processes comparable to those for determining whether an application is associated with the physical object.

Once an application is executing and data are presented for manipulation, at a step 1022, the interactive display system tracks a position and orientation of a representative equivalent ellipse. At a decision step 1024, is the logic determines whether the equivalent ellipse representing the physical object and thus, the physical object, has been moved. If it is determined at decision step 1024 that the equivalent ellipse has moved, at a step 1026, attributes of an application interacting with the physical object are changed in response to that movement, as described above. Translational and/or rotational movement of the physical object can affect execution of an application, as described in connection with FIGS. 4A-9B. For example, the carousel applications described in FIGS. 7A-7C respond to the movement of a physical object. Placement of a physical object can both cause a particular program to be executed, and retrieve data associated with the physical object. Once the application and data are made available, as shown in FIGS. 7B and 7C, any movement of physical object 406 results in motion of its representative equivalent ellipse being detected and therefore, results in the carousel of representations advancing forward or backward for viewing, depending upon the direction of the movement.

Once the physical object and its movement have been detected in accord with the logic of flow diagram 1000, the logic proceeds to a step 1030, wherein the process continues to execute the application and respond to physical objects placed on the interactive display surface.

Response of Particular Applications to Movement of Physical Object

Flow diagrams 1100, 1200, and 1300 of FIGS. 11, 12, and 13 respectively describe how specific exemplary applications described above respond to placement and movement of physical objects. Flow chart 1100 of FIG. 11 describes operation of a jog control system for full-motion video as previously described in connection with FIGS. 7D-7E.

At a step 1102, flow diagram 1100 for display of full-motion video begins with initiation of the video display application. The video display application may be launched in response to the physical object being placed on the interactive display surface, or launched in another manner. At a step 1104, an object may be placed on the interactive display surface. At a step 1106, an equivalent ellipse representative of the physical object is determined, as described above. At a decision step 1108, it is determined if video data are associated with the physical object. If not, at a step 1110, a user is asked to select a video to be presented. At a step 1112, the video data are retrieved.

A decision step 1114 determines whether a play button has been actuated. The play button may be a physical button, a virtual button presented on the interactive display surface that is actuated by the user touching the button, or an input device of another kind. If it is determined at step 1114 that the play button has not been actuated, flow diagram 1100 loops to step 1114 and continues looping until a user directs that video play begin. Once it is determined at decision step 1114 that the play button has been actuated, at a step 1116, the video begins to play.

During play of the video, at a decision step 1118, it is determined if the object has been translated. If so, at a step 1120, a scaling factor to be applied in responding to rotational changes of the physical object is changed in response to a translation of the object, as described in connection with FIGS. 7D-7E. If it is determined at decision step 1118 that the object has not been translated, at a decision step 1122, it is determined if the object has been rotated. If so, the flow diagram proceeds to a step 1124, where playback of the video is adjusted in response to rotational movement of the physical object, as described above in connection with FIG. 7D. If, at step 1120, a scaling factor affecting playback of the video in response to rotation of the physical object was adjusted, the scaling factor is applied to adjust the playback speed in response to the rotation of the object at step 1124. The flow diagram 1100 then loops back to step 1116, where play of the video continues at the adjusted playback speed.

On the other hand, if it is determined at decision step 1122 that the object has not been rotated, at a decision step 1126, it is determined if a pause button—virtual or otherwise—has been actuated. If so, at a step 1128, playback is paused, and flow diagram 1100 loops to decision step 1114, and continues loop to await the play button being pressed to re-start video playback. If it is determined at decision step 1126 that the pause button has not been pressed, at a decision step 1130, it is determined if the stop button—again, real or virtual—has been actuated. If so, flow diagram 1000 loops to decision step 1114, and continues to loop to await actuation of the play button to restart the video playback. On the other hand, if it is determined at step 1130 that the stop button has not been actuated, playing of the video continues at step 1116.

Flow diagram 1200 of FIG. 12 illustrates the operation of a pie menu or marking menu described in connection with FIGS. 8A-8C. At a step 1202, processing of the pie menu begins. At a step 1204, an object may be placed on the interactive display surface by a user. At a step 1206, in one embodiment of the present invention, the interactive display surface determines an equivalent ellipse representative of the physical object as previously described. With the shape of the physical object having been detected and rendered at step 1206, at a step 1208, menu items relevant to placement of the physical object and the state of the application are presented in an array around the physical object, as described in connection with FIGS. 8A-8C. The interactive display system responds to the location of the physical object by arraying the menu options around the position where the physical object is disposed on the interactive display surface. The interactive display system responds to the state of the application by generating relevant menu choices, depending on whether the application is an image viewing application, an audio signal generation application, or some other completely different application, and whether a top-level menu hierarchy or a sub-level menu hierarchy is indicated.

At a step 1210, the object is moved by the user to one of the menu choices to indicate a user selection as shown in FIG. 8B. At a decision step 1212, it is determined if the movement of the physical object has selected a particular menu choice. If not, the flow diagram 1200 loops to decision step 1212 and continues looping until an option is chosen. On the other hand, if it is determined at decision step 1212 that a menu selection has been made by the user moving the physical object, at a decision step 1214, it is determined if a sub-menu is associated with the menu option chosen by the user. If so, the flow diagram returns to step 1208 to present sub-menu choices relevant to the location and application state. In response to the application state, such as the user choosing a particular higher-level menu choice, a sub-menu of selections hierarchically associated with the higher-level menu choice are presented. In response to the location of the physical object, as shown in FIG. 8B, the sub-menu choices are arrayed around the current position of the physical object on the interactive display surface.

On the other hand, if there is not a sub-menu to be presented, at a step 1216, selectable application attributes associated with the menu choice are presented. At a step 1218, the object may be rotated by the user to change an attribute choice, until a desired value is presented, as shown in FIG. 8C. At a decision step 1220, it is determined if the object has been moved so as to make a selection. If not, the flow diagram 1200 loops to decision step 1220 until a selection is made. Once it is determined at decision step 1220 that the object has been rotated, at a step 1222, an extent and direction of the rotation of the object is determined as described in connection with FIGS. 6A and 6C. At a step 1224, the attribute is changed in accordance with the rotation of the physical object, once the user confirms the selection of the value. At a step 1226, execution of the application resumes with the changed attribute. Execution of the application continues at step 1228.

In FIG. 13, flow diagram 1300 illustrates the logical steps for generating and varying audio signals in response to placement and movement of a physical object on the interactive display surface. More particularly, the flow diagram 1300 describes the logical steps for generating audio signals in an exemplary embodiment of the invention shown in illustration 950 of FIG. 9B. Steps for recording, playing back, and moving forward and backward through such a recording are not included in flow diagram 1300 for the sake of simplicity.

An audio signal generation application is started at step 1302. At a step 1304, a user may place an object on the interactive display surface. More particularly, considering the exemplary embodiment of illustration 950 of FIG. 9B, the object is disposed in one of the percussion and melody regions 974 and 976. At a decision step 1306, it is determined if an object has been placed on the interactive display surface. If not, the flow diagram 1300 loops to decision step 1306 awaiting placement of an object on the interactive display surface. Once it is determined at decision step 1306 that an object has been placed on the interactive display surface, at a step 1308, an equivalent ellipse representative of the object is determined as described above. At a step 1310, major and minor axes of the equivalent ellipse are determined for use in producing an appropriate audio signal, as described below.

At a decision step 1312, it is determined if the object is placed in percussion region 974 (of illustration 950 in FIG. 9B). If so, at a step 1314, a percussion look-up table is accessed, and the flow diagram proceeds to a step 1318. If not, the object was placed in melody region 976 (of illustration 950 in FIG. 9B), and at a step 1316, a melody look-up table is accessed, and the flow diagram proceeds to step 1318.

At step 1318, the appropriate look-up table is consulted to determine an audio signal associated with the representative equivalent ellipse determined by looking up an entry corresponding to a major axis of the object in one dimension of the look-up table and a minor axis of the object in another dimension of the look-up table. It will be appreciated that, alternatively, an appropriate mathematical function could be applied as a function of the dimensions of the equivalent ellipse to generate an appropriate audio signal.

At a step 1320, if desired, a user rotates the physical object. At a decision step 1322, it is determined if the object has been rotated. In one embodiment of the present invention, rotation of the physical object indicates a desire of the user to adjust qualities of the audio signal. If it is determined at decision step 1322 that the object has not been rotated, the logic of flow diagram 1300 proceeds to a step 1330, where the appropriate audio signal that was retrieved from the look-up table is generated.

On the other hand, it if is determined at decision step 1322 that the physical object has been rotated, at a step 1324, changeable audio signal attributes are accessed. At a step 1326, using the attributes accessed at step 1324, a pie menu/marking menu handler as described in flow diagram 1200 of FIG. 12 is invoked to enable the user to adjust qualities of the audio signal. These qualities, as shown in illustration 950 of FIG. 9B, may include the volume of the audio signal, the pitch of the audio signal, the duration for which the audio signal is sustained, and whether and to what extent the audio signal is repeated. Rotating the physical object also may be used to alter harmonic properties of the audio signal. At a step 1328, qualities of the audio signal to be generated are altered in accordance with movement of the physical object by the user. At a step 1330, in accordance with the altered qualities changed by rotating the physical object, the audio signal is generated. The logic of flow diagram 1300 loops to decision step 1306 to await placement of an object on the interactive display surface.

Although the present invention has been described in connection with the preferred form of practicing it and modifications thereto, those of ordinary skill in the art will understand that many other modifications can be made to the present invention within the scope of the claims that follow. For example, rotating physical objects can be used to control scrolling in vertical and horizontal directions through a document, or in a Web page displayed in a browser on the interactive table. Accordingly, it is not intended that the scope of the invention in any way be limited by the above description, but instead be determined entirely by reference to the claims that follow.

The invention in which an exclusive right is claimed is defined by the following:

1. A method for providing input to a computer system having an interactive display surface by manipulating a physical object disposed adjacent to the interactive display surface, the method comprising the steps of:
   executing an application on the computer system, the application having at least one attribute changeable while the application is executing;
   detecting a location and an orientation of the physical object relative to the interactive display surface based upon a characteristic of the physical object when the physical object is disposed adjacent to the interactive display surface, the characteristic including at least one of a shape, a size, and an optical quality as well as at least one of the orientation of the object and the location of the physical object, such that at least one of rotating and translating the physical object changes the attribute;
   correlating the attribute with the orientation of the physical object;
   detecting a change in the location of the physical object on the interactive display surface;
   adjusting a scaling factor based on the change in the location of the physical object on the interactive display surface;
   changing the attribute in response to at least one of the location and a movement of the physical object relative to the interactive display surface; and
   applying the scaling factor to changes in the attribute associated with rotation of the physical object.

2. The method of claim 1, further comprising the step of determining the characteristic of the physical object, said step of determining the characteristic of the physical object comprising the steps of:
   (a) transmitting infrared light through the interactive display surface toward a face of the interactive display surface adjacent to which the physical object is disposed; and
   (b) determining the characteristic of the physical object by sensing infrared light reflected from the physical object back through the interactive display surface.

3. The method of claim 2, further comprising determining the characteristic of the physical object by creating an ellipse representative of the characteristic of the physical object, the ellipse having an equivalent statistical center, spatial moments of points on the physical object reflecting infrared light through the interactive display surface and thus defining the characteristic.

4. The method of claim 3, wherein the points defining the characteristic of the physical object include adjoining points meeting a predefined condition.

5. The method of claim 2, further comprising determining the characteristic of the physical object by creating an ellipse representative of the characteristic of the physical object, the ellipse having dimensions large enough to encompass an outermost point of all points defining the characteristic.

6. The method of claim 5, wherein the outermost points include points not having adjoining points in all considered directions.

7. The method of claim 1, wherein the attribute is correlated with the characteristic of the physical object by:
   (a) associating the attribute with a region of the interactive display surface; and
   (b) detecting when the physical object is disposed adjacent to the region of the interactive display surface associated with the attribute.

8. The method of claim 1, further comprising the steps of:
   (a) displaying on the interactive display surface a plurality of indicators respectively representing a plurality of changeable program attributes; and
   (b) enabling a user to select a desired attribute among the plurality of changeable program attributes by one of rotating the physical object and translating the physical object toward a desired indicator representing the desired secondary attribute.

9. The method of claim 8, further comprising the steps of:
   (a) displaying on the interactive display surface a plurality of secondary indicators representing a plurality of secondary changeable program attributes associated with the desired indicator; and
   (b) enabling a user to select a desired secondary attribute among the plurality of secondary changeable program attributes by one of rotating the physical object and translating the physical object toward a desired secondary indicator.

10. The method of claim 8, further comprising the steps of:
   (a) detecting selection of the desired attribute; and
   (b) enabling a user to change a value of the changeable program attribute selected by one of rotating the physical object and translating the physical object.

11. The method of claim 1, further comprising the steps of:
   (a) associating a plurality of data elements with the physical object;
   (b) depicting the data elements with representations displayed on the interactive display surface adjacent a position of the physical object; and
   (c) at least one of revolving and moving the representations to correspond with at least one of a rotation and a translation of the physical object.

12. The method of claim 1, further comprising the step of generating an audio signal when the physical object is disposed adjacent to the interactive display surface, the audio signal generated being associated with one of the location and the shape of the physical object.

13. The method of claim 12, wherein the audio signal generated is generated from a predetermined list of audio signals, each being associated with a different shape of a physical object.

14. The method of claim 12, wherein the audio signal generated is varied according to the position on the interactive display surface where the physical object is disposed.

15. The method of claim 12, wherein the interactive display surface is partitioned into a plurality of regions, each of the regions being associated with a different category of audio signals associated with different shapes of physical objects.

16. The method of claim 12, further comprising the step of adjusting a property of the audio signal generated upon detecting at least one of a rotation and a translation of the physical object.

17. The method of claim 16, wherein the property of the audio signal includes at least one of a pitch, a tempo, a sustain, a repetition, and a harmonic quality.

18. A memory medium on which are stored machine instructions for carrying out the steps of claim 1.

19. A method for providing input to a computer system having an interactive display surface by manipulating a physical object disposed adjacent to the interactive display surface, the method comprising the steps of:
    executing an application on the computer system, the application having at least one attribute changeable while the application is executing;
    determining a characteristic of the physical object by identifying an ellipse representative of the characteristic of the physical object;
    correlating the attribute with a position of the ellipse, the position of the ellipse including at least one of an orientation and a location relative to the interactive display surface;
    determining an initial position of the ellipse; and
    detecting a change in the location of the ellipse relative to the interactive display surface;
    adjusting a scaling factor based on the change in the location of the ellipse relative to the interactive display surface;
    changing the attribute in response to a change in position of the ellipse; and
    applying the scaling factor to changes in the attribute associated with the rotation of the ellipse.

20. The method of claim 19, further comprising the step of determining the characteristic of the physical object, said step of determining the characteristic comprising the steps of:
    (a) transmitting infrared light through the interactive display surface toward a face of the interactive display surface adjacent to which the physical object is disposed; and
    (b) determining the characteristic of the physical object by sensing infrared light reflected from the physical object back through the interactive display surface.

21. The method of claim 20, wherein the ellipse representative of the characteristic of the physical object includes a statistical center and spatial moments equivalent to points on the physical object reflecting infrared light through the interactive display surface and thus defining the characteristic.

22. The method of claim 21, wherein the points defining the characteristic of the physical object include adjoining points meeting a predefined condition.

23. The method of claim 21, wherein the outermost points include points not having adjoining points in all considered directions.

24. The method of claim 20, wherein the ellipse representative of the characteristic of the physical object includes dimensions large enough to encompass an outermost point of all points defining the characteristic.

25. The method of claim 19, wherein the attribute is correlated with the characteristic of the physical object by:
    (a) associating the attribute with a region of the interactive display surface; and
    (b) detecting when the physical object is disposed adjacent to the region of the interactive display surface associated with the attribute.

26. The method of claim 19, further comprising the steps of:
    (a) displaying on the interactive display surface a plurality of indicators representing a plurality of changeable program attributes; and
    (b) enabling a user to select a desired attribute among the plurality of changeable program attributes by one of rotating the physical object and translating the physical object toward a desired indicator representing the desired attribute.

27. The method of claim 26, further comprising the steps of:
    (a) displaying on the interactive display surface a plurality of secondary indicators representing a plurality of secondary changeable program attributes associated with the desired indicator; and
    (b) enabling the user to select a desired secondary attribute among the plurality of secondary changeable program attributes by one of rotating the physical object and translating the physical object toward a desired secondary indicator.

28. The method of claim 26, further comprising the steps of:
    (a) detecting selection of the desired attribute; and
    (b) enabling the user to change a value of the changeable program attribute selected by one of rotating the physical object and translating the physical object.

29. The method of claim 19, further comprising the steps of:
    (a) associating a plurality of data elements with the physical object;
    (b) depicting the data elements with representations displayed on the interactive display surface adjacent a position of ellipse representing a characteristic of the physical object; and
    (c) at least one of rotating and moving the representations to correspond with at least one of a rotation and a translation of the physical object.

30. The method of claim 19, further comprising the step of generating an audio signal when the physical object is disposed adjacent to the interactive display surface, the audio signal generated being associated with one of the location and the shape of the physical object.

31. The method of claim 30, wherein the audio signal is generated from a predetermined list of audio signals associated with corresponding different shapes of physical objects.

32. The method of claim 30, wherein a quality of the audio signal generated depends on the position on the interactive display surface where the physical object is disposed.

33. The method of claim 32, wherein the interactive display surface is partitioned into a plurality of regions, each of which is associated with a different category of audio signals.

34. The method of claim 30, further comprising the step of adjusting a property of the audio signal generated in response to at least one of a rotation or a translation of the physical object.

35. The method of claim 34, wherein the property of the audio signal includes at least one of a pitch, a tempo, a sustain, a repetition, and a harmonic quality.

36. A memory medium on which are stored machine instructions for carrying out the steps of claim 19.

37. A system for providing input to an application that is being executed, comprising:
 (a) an interactive display surface adjacent to which the physical object is manipulated, said interactive display surface diffusing light, and having a processing side and an interactive side from which the image is viewed and adjacent to which the physical object can be placed, the processing side being opposite to the interactive side;
 (b) a projector that projects graphic images onto the processing side of the interactive display surface, said graphic images being visible from the interactive side;
 (c) a light source disposed on the processing side of the display surface, the light source emitting infrared light that is transmitted through the display surface to the interactive side and reflected back through the interactive display surface by the physical object that is disposed adjacent to the interactive side of the interactive display surface;
 (d) a light sensor disposed on the processing side of the interactive display surface, the light sensor sensing infrared light reflected back from the physical object through the interactive display surface and imaging the interactive display surface to detect the physical object and its location;
 (e) a processor in communication with the light sensor; and
 (f) a memory in communication with the processor, the memory storing data and machine instructions that cause the processor to carry out a plurality of functions, including:
  (i) executing an application with the processor, the application having at least one attribute changeable while the application is executing;
  (ii) detecting the location and an initial orientation of the physical object relative to the interactive display surface based upon a characteristic of the physical object when the physical object is disposed adjacent to the interactive display surface, the characteristic including at least one of a shape, a size, and an optical quality;
  (iii) correlating the attribute with the characteristic of the physical object; and
  (iv) changing the attribute in response to at least one of the location and a movement of the physical object relative to the interactive display surface.

38. The system of claim 37, wherein the machine instructions stored in the memory further cause the processor to determine the characteristic of the physical object by creating an ellipse representative of the characteristic of the physical object, the ellipse one of having an equivalent statistical center and spatial moments of points defining the characteristic, and having dimensions large enough to encompass all outermost points of the points defining the characteristic.

39. The system of claim 37, wherein the machine instructions stored in the memory further cause the processor to recognize the points defining the characteristic of the physical object as including adjoining points meeting a predefined condition.

40. The method of claim 39, wherein the outermost points include points not having adjoining points meeting the predefined condition.

41. The system of claim 37, wherein the characteristic includes at least one of the orientation of the object and the position of the physical object, such that at least one of rotating and translating the physical object changes the attribute.

42. The system of claim 41, wherein the machine instructions stored in the memory further cause the processor to correlate the attribute with the characteristic of the physical object by:
 (a) associating the attribute with a region of the interactive display surface; and
 (b) detecting when the physical object is disposed adjacent to the region of the interactive display surface associated with the attribute.

43. The system of claim 41, wherein the machine instructions stored in the memory further cause the processor to:
 (a) correlate a value of the attribute with the orientation of the physical object;
 (b) detect a change in the location of the physical object on the interactive display surface;
 (c) adjust a scaling factor based on the change in the location of the physical object on the interactive display surface; and
 (d) apply the scaling factor to changes in the attribute associated with rotation of the physical object.

44. The system of claim 41, wherein the machine instructions stored in the memory further cause the processor to:
 (a) display on the interactive display surface a plurality of indicators representing a plurality of changeable program attributes; and
 (b) enable a user to select a desired attribute among the plurality of changeable program attributes by one of rotating the physical object and translating the physical object toward a desired indicator representing the desired attribute.

45. The system of claim 44, wherein the machine instructions stored in the memory further cause the processor to:
 (a) display on the interactive display surface a plurality of secondary indicators representing a plurality of secondary changeable program attributes associated with the desired indicator; and
 (b) enable a user to select a desired secondary attribute among the plurality of secondary changeable program attributes by one of rotating the physical object and translating the physical object toward a desired secondary indicator representing the desired secondary attribute.

46. The system of claim 44, wherein the machine instructions stored in the memory further cause the processor to:
 (a) detect a selection of the desired attribute; and
 (b) enable a user to change a value of the changeable program attribute selected by one of rotating the physical object and translating the physical object.

47. The system of claim 41, wherein the machine instructions stored in the memory further cause the processor to:
 (a) associate a plurality of data elements with the physical object;
 (b) depict the data elements with representations displayed on the interactive display surface adjacent a position of the physical object; and (c) at least one of revolve and move the representations to correspond with at least one of a rotation and a translation of the physical object.

48. The system of claim 41, wherein the machine instructions stored in the memory further cause the processor to cause an audio signal to be generated when the physical object is disposed adjacent to the interactive display surface, the audio signal generated being associated with one of the location and the shape of the physical object.

49. The system of claim 48, wherein the machine instructions stored in the memory further cause the processor to the audio signal generated to be varied according to the position on the interactive display surface where the physical object is disposed.

50. The system of claim 48, wherein the machine instructions stored in the memory further cause the processor to partition the interactive display surface into a plurality of regions, each of the regions being associated with a different category of audio signals associated with different shapes of physical objects.

51. The system of claim 48, wherein the machine instructions stored in the memory further cause the processor to adjust a property of the audio signal generated upon detecting at least one of a rotation and a translation of the physical object.

52. The system of claim 48, wherein the property of the audio signal includes at least one of a pitch, a tempo, a sustain, a repetition, and a harmonic quality.

53. The system of claim 48, wherein the machine instructions stored in the memory further cause the processor to cause the audio signal to be generated as define by a predetermined list of audio signals, each being associated with a different shape of a physical object.

54. A method for providing input to a computer system having an interactive display surface by manipulating a physical object disposed adjacent to the interactive display surface, the method comprising the steps of:
executing an application on the computer system, the application having a plurality of changeable program attributes that are changeable while the application is executing;
displaying a plurality of indicators representing a plurality of changeable program attributes on the interactive display surface;
determining a characteristic of the physical object by identifying an ellipse representative of the characteristic of the physical object;
determining an initial position of the ellipse;
enabling a user to select a desired attribute among the plurality of changeable program attributes by one of rotating the physical object and translating the physical object toward a desired indicator representing the desired attribute;
correlating the selected attribute with a position of the ellipse, the position of the ellipse including at least one of an orientation and a location relative to the interactive display surface;
changing the attribute in response to a change in position of the ellipse;
displaying on the interactive display surface a plurality of secondary indicators representing a plurality of secondary changeable program attributes associated with the desired indicator; and
enabling the user to select a desired secondary attribute among the plurality of secondary changeable program attributes by one of rotating the physical object and translating the physical object toward a desired secondary indicator.

55. A method for providing input to a computer system having an interactive display surface by manipulating a physical object disposed adjacent to the interactive display surface, the method comprising the steps of:
executing an application on the computer system, the application having at least one attribute changeable while the application is executing;
detecting a location and an orientation of the physical object relative to the interactive display surface based upon a characteristic of the physical object when the physical object is disposed adjacent to the interactive display surface, the characteristic including at least one of a shape, a size, and an optical quality;
correlating the attribute with the physical object;
changing the attribute in response to at least one of the location and a movement of the physical object relative to the interactive display surface, wherein changing the attribute includes:
generating an audio signal when the physical object is disposed adjacent to the interactive display surface, the audio signal generated being associated with one of the location and the shape of the physical object, wherein the audio signal is generated from a predetermined list of audio signals, each being associated with a different shape of a physical object.

* * * * *

UNITED STATES PATENT AND TRADEMARK OFFICE
CERTIFICATE OF CORRECTION

PATENT NO.         : 7,379,047 B2                          Page 1 of 1
APPLICATION NO.    : 10/883253
DATED              : May 27, 2008
INVENTOR(S)        : Steven M. Drucker et al.

It is certified that error appears in the above-identified patent and that said Letters Patent is hereby corrected as shown below:

In column 27, line 32, in Claim 19, after "ellipse;" delete "and".

Signed and Sealed this
Nineteenth Day of July, 2011

David J. Kappos
*Director of the United States Patent and Trademark Office*